(12) United States Patent
Pronovost et al.

(10) Patent No.: US 7,444,637 B2
(45) Date of Patent: Oct. 28, 2008

(54) SYSTEMS AND METHODS FOR SCHEDULING COPROCESSOR RESOURCES IN A COMPUTING SYSTEM

(75) Inventors: Steve Pronovost, Redmond, WA (US);
Anuj B. Gosalia, Redmond, WA (US);
Bryan L. Langley, Duvall, WA (US);
Hideyuki Nagase, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1018 days.

(21) Appl. No.: 10/777,797

(22) Filed: Feb. 12, 2004

(65) Prior Publication Data
US 2004/0187135 A1 Sep. 23, 2004

Related U.S. Application Data

(60) Provisional application No. 60/448,402, filed on Feb. 18, 2003, provisional application No. 60/448,399, filed on Feb. 18, 2003, provisional application No. 60/448,400, filed on Feb. 18, 2003.

(51) Int. Cl.
*G06F 9/46* (2006.01)
*G06F 13/28* (2006.01)
*G06F 9/34* (2006.01)
*G06F 15/76* (2006.01)

(52) U.S. Cl. .................. 718/104; 718/102; 718/103; 718/105; 711/151; 711/206; 711/208; 711/209; 712/34

(58) Field of Classification Search ............. 718/1–108; 711/200–221, 151; 712/34, 228, 229
See application file for complete search history.

(56) References Cited

U.S. PATENT DOCUMENTS

| 5,058,037 | A | * | 10/1991 | Kageyama et al. | 358/1.17 |
| 5,220,653 | A | | 6/1993 | Miro | 718/107 |
| 5,247,674 | A | | 9/1993 | Kogure | 711/170 |
| 5,696,927 | A | | 12/1997 | MacDonald et al. | 711/207 |

(Continued)

FOREIGN PATENT DOCUMENTS

WO WO 02/09083 1/2002

OTHER PUBLICATIONS

Burgess, P. et al., "BED:A Multithread Kernel for Embedded Systems", *Real Time Programming, IFAC Workshop*, 1994, 133-138.

(Continued)

*Primary Examiner*—Meng-Ai An
*Assistant Examiner*—Abdullah Al Kawsar
(74) *Attorney, Agent, or Firm*—Woodcock Washburn LLP

(57) ABSTRACT

Systems and methods for scheduling coprocessing resources in a computing system are provided without redesigning the coprocessor. In various embodiments, a system of preemptive multitasking is provided achieving benefits over cooperative multitasking by any one or more of (1) executing rendering commands sent to the coprocessor in a different order than they were submitted by applications; (2) preempting the coprocessor during scheduling of non-interruptible hardware; (3) allowing user mode drivers to build work items using command buffers in a way that does not compromise security; (4) preparing DMA buffers for execution while the coprocessor is busy executing a previously prepared DMA buffer; (5) resuming interrupted DMA buffers; and (6) reducing the amount of memory needed to run translated DMA buffers.

43 Claims, 14 Drawing Sheets

U.S. PATENT DOCUMENTS

| | | | | |
|---|---|---|---|---|
| 5,742,797 | A | 4/1998 | Celi et al. | 345/548 |
| 5,777,629 | A | 7/1998 | Baldwin | 345/506 |
| 5,790,804 | A * | 8/1998 | Osborne | 709/245 |
| 5,864,713 | A | 1/1999 | Terry | 710/52 |
| 5,896,141 | A | 4/1999 | Blaho et al. | 345/541 |
| 5,918,050 | A | 6/1999 | Rosenthal et al. | 718/108 |
| 5,930,827 | A | 7/1999 | Sturges | 711/170 |
| 6,023,738 | A | 2/2000 | Priem et al. | 710/23 |
| 6,049,857 | A | 4/2000 | Watkins | 711/207 |
| 6,065,071 | A | 5/2000 | Priem et al. | 710/22 |
| 6,069,638 | A | 5/2000 | Porterfield | 345/568 |
| 6,081,854 | A | 6/2000 | Priem et al. | 710/37 |
| 6,222,564 | B1 | 4/2001 | Sturges | 345/542 |
| 6,252,600 | B1 | 6/2001 | Kohli et al. | 345/219 |
| 6,295,602 | B1 * | 9/2001 | Weissman et al. | 713/1 |
| 6,437,788 | B1 | 8/2002 | Milot et al. | 345/552 |
| 6,446,186 | B1 | 9/2002 | Priem et al. | 711/206 |
| 6,477,612 | B1 | 11/2002 | Wang | 711/2 |
| 6,496,912 | B1 | 12/2002 | Fields et al. | 711/170 |
| 6,518,973 | B1 | 2/2003 | Blythe | 345/542 |
| 6,525,739 | B1 | 2/2003 | Gurumoorthy et al. | 345/566 |
| 6,600,493 | B1 | 7/2003 | Sethi et al. | 345/543 |
| 6,650,333 | B1 | 11/2003 | Baldwin | 345/531 |
| 6,691,180 | B2 | 2/2004 | Priem et al. | 710/23 |
| 6,704,871 | B1 * | 3/2004 | Kaplan et al. | 713/192 |
| 6,708,273 | B1 * | 3/2004 | Ober et al. | 713/189 |
| 6,782,432 | B1 * | 8/2004 | Nelson et al. | 710/1 |
| 6,798,421 | B2 | 9/2004 | Baldwin | 345/557 |
| 6,859,208 | B1 | 2/2005 | White | 345/542 |
| 6,947,051 | B2 * | 9/2005 | Gossalia et al. | 345/543 |
| 7,234,144 | B2 * | 6/2007 | Wilt et al. | 718/104 |
| 7,346,905 | B2 * | 3/2008 | Dorrance et al. | 718/104 |
| 2002/0118202 | A1 | 8/2002 | Baldwin | 345/530 |
| 2003/0140179 | A1 | 7/2003 | Wilt et al. | 709/321 |
| 2004/0187122 | A1 | 9/2004 | Gosalia | 718/102 |
| 2004/0231000 | A1 | 11/2004 | Gosalia | 345/568 |
| 2005/0168472 | A1 | 8/2005 | Gosalia | 345/568 |

OTHER PUBLICATIONS

Macedonia, M., "The GPU Enters Computing's Mainstream", *Computer*, Oct. 2003, 36(10), 106-108.

Petrot, F. et al., "Lightweight Implementation of the POSIX Threads API for an On-Chip MIPS Multiprocessor with VCI Interconnect", *Proceedings Design, Automation and Test in Europe Conference and Exhibition*, Mar. 3-7, 2003, Munich, Germany, 51-56.

Kirk, D.B., "SMART (Strategic memory allocation for real time) cache design," IEEE, 1989, 229-237.

Francesc et al., "Memto: a memory monitoring tool for a linux cluster," Springer Berlin/heidelberg, 2001, 225-232.

Torvalds, L. et al., "Excerpt from the Linux Kernel, version 2.4.20," http://www.kernel.org/pub/linux/kernel/v2.4/linux-2.4.20.tar.bz2, Nov. 2002, 1-87.

Intel Corp, "Accelerated Graphics Port Interface Specification, Revision 1.0," Jul. 1996, 1-161.

Martin, K.E. et al., "Direct Rendering Infrastructure, Low-Level Design Document," http://dri.sourceforge.net/doc/design_low_level.html, May 1999, 1-18.

Owen, J. et al., "A Multiple Direct Rendering Architecture for 3D," http://dri.sourceforge.net/doc/design_high_level.html, Sep. 1998, 1-10.

* cited by examiner

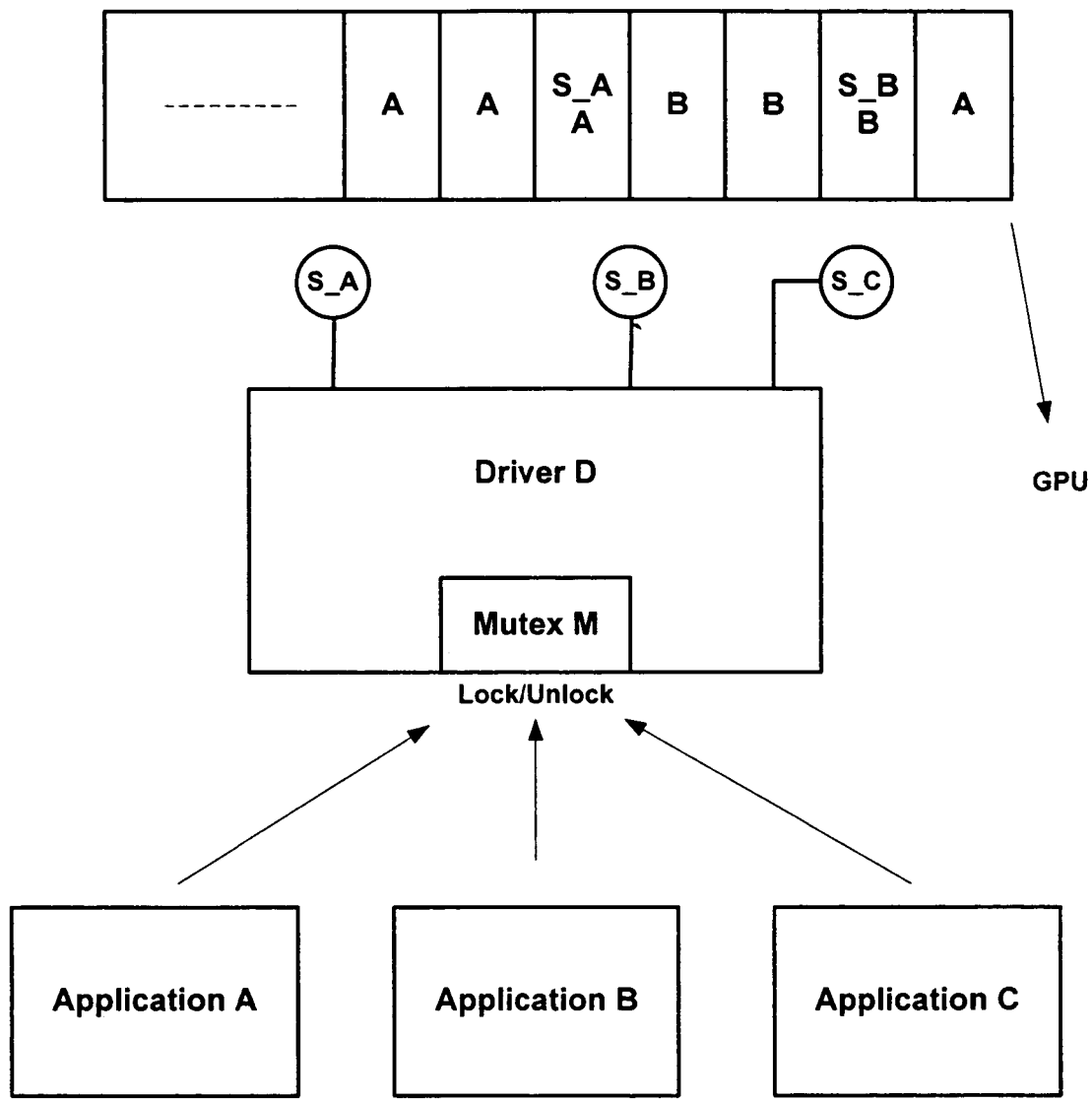
FIG. 1 – Prior Art

Exemplary algorithm
*PROCESS A: Submit (irql passive, rendering thread context)*
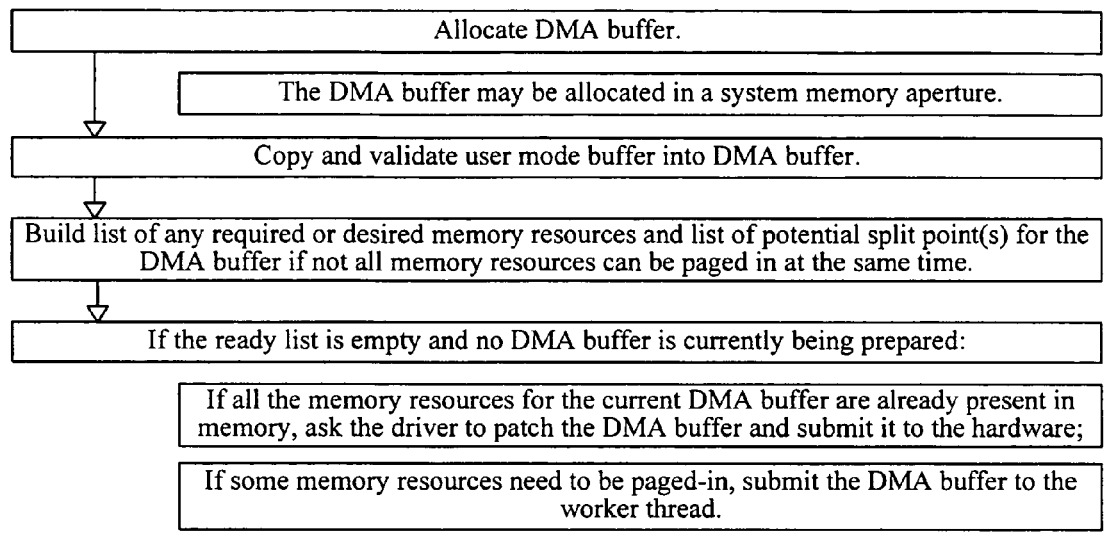
*PROCESS B: Quantum expires (irql device, any thread context)*
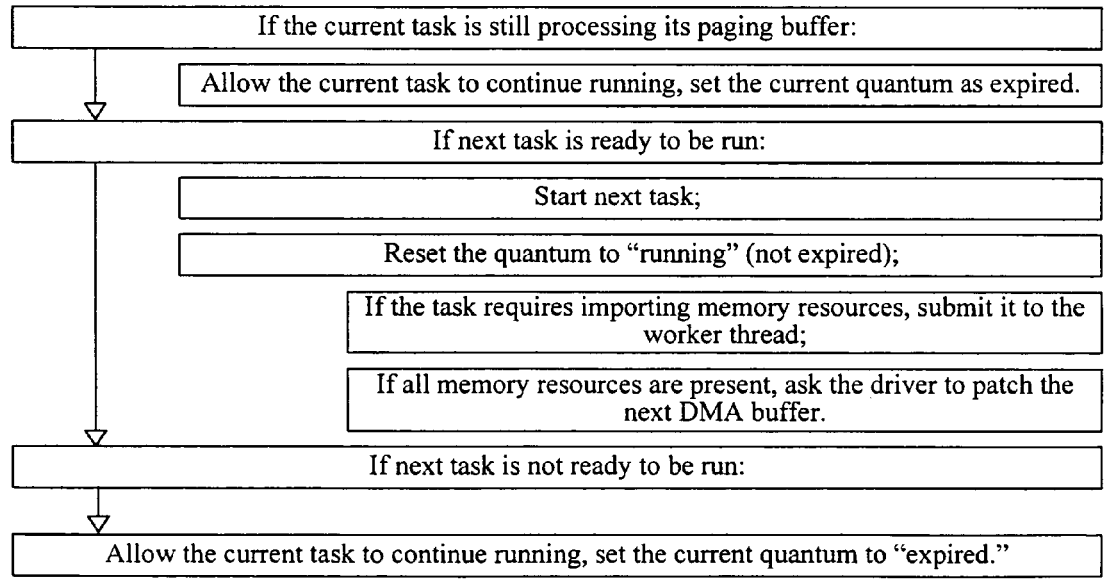
Fig. 6A

SYSTEMS AND METHODS FOR SCHEDULING COPROCESSOR RESOURCES IN A COMPUTING SYSTEM

CROSS-REFERENCE TO RELATED APPLICATIONS

This application claims the benefit of U.S. Provisional Application No. 60/448,402, filed Feb. 18, 2003, entitled "GPU Scheduler Overview," U.S. Provisional Application No. 60/448,399, filed Feb. 18, 2003, entitled "Video Memory Management Architecture Specification" and U.S. Provisional Application No. 60/448,400, filed Feb. 18, 2003, entitled "Video Memory Management Rectangular Heap."

FIELD OF THE INVENTION

The present invention relates to systems and methods for scheduling coprocessing resources in a computing system. More particularly, the present invention relates to systems and methods for scheduling use of coprocessor resources wherein the coprocessor is unaware of client context.

BACKGROUND OF THE INVENTION

Computer systems typically include one or more coprocessors. For example, a graphics processing unit (GPU) is an example of a coprocessor that performs specialized processing of tasks to which it is well suited, freeing the host processor to perform other tasks. In some cases, a coprocessor may reside on the system's motherboard with a central processing unit (CPU), such as a microprocessor, and in other systems a coprocessor may reside on a separate graphics card. A coprocessor often accesses supplemental memory, for example, video memory, in performing its processing tasks. Some coprocessors are optimized to perform three-dimensional graphics calculations to support applications such as games and computer aided design (CAD). While current computer systems and coprocessors perform adequately when running a single graphically intensive application, they may experience problems when running multiple graphically intensive applications.

One reason for this is the typical coprocessor's inability to efficiently schedule its workload. In current operating systems, the GPU is multitasked using a cooperative approach (i.e., each application submits operations to the GPU driver which serializes and executes them in the order they were received). This approach does not scale well when many application with differing priority access the same resources. With cooperative multitasking, an application currently "controlling" the coprocessor must relinquish control to other applications in order for those other applications to achieve their coprocessing objectives. If the application fails to relinquish control, e.g., because the work request it has submitted to the coprocessor is voluminous or for some other reason, it can effectively "hog" the coprocessor. While this has not been a significant concern when running a single graphically intensive program, the problem of hogging the coprocessor can become more serious when multiple applications attempt to use a coprocessor. One can only imagine being required to wait 10 seconds or more for the mere rendering of a mouse movement to appreciate that hogging of the coprocessor by an application introduces undesirable eventualities in the computing environment. It would thus be desirable to have more efficient scheduling of coprocessor resources.

While the problem of apportioning processing between operations has been addressed in the context of a CPU, where sophisticated scheduling of multiple operations has become necessary, scheduling for coprocessors has not been effectively addressed. This is because the coprocessor, in present day systems, is generally seen as a resource to divert calculation-heavy and time consuming operations away from the CPU, providing the CPU with more processing time for other functions. Such calculation-heavy operations are often graphics operations, which are known to require significant processing power. As the sophistication of applications increases, they often require greater reliance on the coprocessor to handle robust calculation and rendering activities. This increased reliance, in turn, creates an as-yet unforeseen need to surmount the technical barriers involved in intelligent apportioning of coprocessor resources. For these and other reasons, systems and methods for efficiently scheduling coprocessor tasks and other use of coprocessor resources are desired. It is further desirable to provide intelligent scheduling of coprocessor resources using existing coprocessors and existing hardware architecture, i.e., without redesigning the coprocessor with an eye towards multi-tasking.

In more detail, as illustrated in FIG. 1, in today's graphics systems, scheduling is generally handled as follows. Applications, such as application A, application B and application C submit work to a driver D via a mutex M that effectively only allows one application to communicate to driver D at a time, behaving as a lock on the driver D. Driver D maintains the state S_A, S_B and S_C of applications A, B and C, e.g., information about a texture, a render target, lighting, z-buffering, compression, etc. As GPU work requests are received from the applications, they are placed in a buffer. If a switch between applications occurs as part of a work request, then the state for the new application is restored prior to submitting the work to the GPU. In this fashion, while the GPU is unaware of the operation of the applications, multiple applications can still request GPU resources. However, the present system is "first come, first serve" which can be a problem. Some work requests are higher priority than others, and an application that submits a lot of work that takes, e.g., 10 seconds, to complete will snub all other applications' work requests during that time period. Accordingly, a system that utilizes existing hardware, but avoids the problems associated with "hogging" of the GPU by an application is desired.

SUMMARY OF THE INVENTION

In consideration of the above-identified shortcomings of the art, the present invention provides systems and methods for scheduling coprocessing resources in a computing system without redesigning the coprocessor. In various embodiments, the invention provides a system of preemptive multitasking achieving benefits over cooperative multitasking by any one or more of (1) executing rendering commands sent to the coprocessor in a different order than they were submitted by applications; (2) preempting the coprocessor during scheduling of non-interruptible hardware; (3) allowing user mode drivers to build work items using command buffers in a way that does not compromise security; (4) preparing DMA buffers for execution while the coprocessor is busy executing a previously prepared DMA buffer; (5) resuming interrupted DMA buffers; and (6) reducing the amount of memory needed to run translated DMA buffers.

Other advantages and features of the invention are described below.

BRIEF DESCRIPTION OF THE DRAWINGS

The systems and methods for scheduling coprocessing resources in accordance with the present invention are further described with reference to the accompanying drawings in which:

FIG. 1 is an exemplary diagram illustrating prior art scheduling and hogging of coprocessing resources;

FIGS. 6A and 6B are exemplary pseudocode algorithms that demonstrate various non-limiting possible ways to combine the acts of FIG. 5 into a functional sequence;

DETAILED DESCRIPTION OF ILLUSTRATIVE EMBODIMENTS

Overview

As mentioned, in various embodiments, the invention provides a system of preemptive multitasking achieving benefits over cooperative multitasking by any one or more of (1) executing rendering commands sent to the GPU in a different order than they were submitted by applications; (2) preempting the GPU during scheduling on non-interruptible hardware; (3) allowing user mode drivers to build work items using command buffers in a way that does not compromise security; (4) preparing DMA buffers for execution while the GPU is busy executing a previously prepared DMA buffer; (5) resuming interrupted DMA buffers; and (6) reducing the amount of memory needed to run translated DMA buffers.

The invention is described in further detail following the below general description of the kinds of computing environments in which the invention may be implemented. In short, the invention is widely applicable to any computing environment in which multiple applications, services, objects, etc. may demand coprocessing resources.

Exemplary Networked and Distributed Environments

One of ordinary skill in the art can appreciate that the invention can be implemented in connection with any computer or other client or server device, which can be deployed as part of a computer network, or in a distributed computing environment. In this regard, the present invention pertains to any computer system or environment having any number of memory or storage units, and any number of applications and processes occurring across any number of storage units or volumes, which may be used in connection scheduling coprocessor resources in accordance with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the GPU resources, and thus the invention has wide applicability.

Figure 2A:
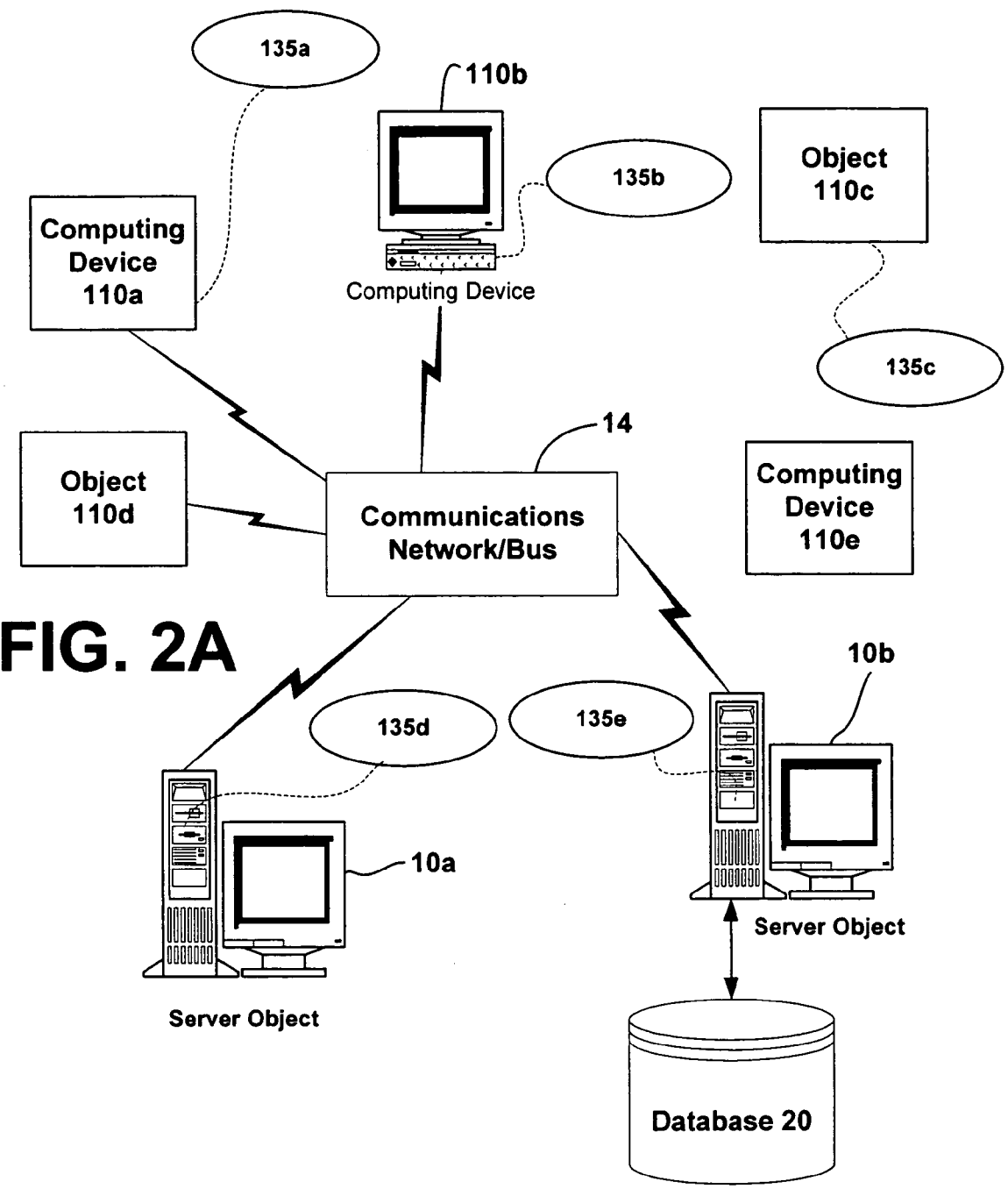
FIG. 2A is a block diagram representing an exemplary network environment having a variety of computing devices in which the present invention may be implemented.

FIG. 2A provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, audio/video devices, MP3 players, personal computers, etc. Each object can communicate with another object by way of the communications network 14. This network may itself comprise other computing objects and computing devices that provide services to the system of FIG. 2A, and may itself represent multiple interconnected networks. In accordance with an aspect of the invention, each object 10a, 10b, etc. or 110a, 110b, 110c, etc. may contain an application that might make use of an API, or other object, software, firmware and/or hardware, to request use of scheduling of coprocessor resources in accordance with the invention.

It can also be appreciated that an object, such as 110c, may be hosted on another computing device 10a, 10b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to scheduling coprocessor resources according to the present invention.

In home networking environments, there are at least four disparate network transport media that may each support a unique protocol, such as Power line, data (both wireless and wired), voice (e.g., telephone) and entertainment media. Most home control devices such as light switches and appliances may use power lines for connectivity. Data Services may enter the home as broadband (e.g., either DSL or Cable modem) and are accessible within the home using either wireless (e.g., HomeRF or 802.11B) or wired (e.g., Home PNA, Cat 5, Ethernet, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also digital interconnects for clusters of media devices. All of these network environments and others that may emerge as protocol standards may be interconnected to form a network, such as an intranet, that may be connected to the outside world by way of the Internet. In short, a variety of disparate sources exist for the storage and transmission of data, and consequently, moving forward, computing devices will require ways of sharing data, such as data accessed or utilized incident to program objects, which request coprocessor resources for scheduling in accordance with the present invention.

The Internet commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers executing networking protocols that allow users to interact and share information over the network(s). Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2A, computers $110a$, $110b$, etc. can be thought of as clients and computers $10a$, $10b$, etc. can be thought of as the server where server $10a$, $10b$, etc. maintains the data that is then replicated in the client computers $110a$, $110b$, etc., although any computer can be considered a client, a server, or both, depending on the circumstances. Any of these computing devices may be processing data or requesting services or tasks that may implicate the techniques of the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques of the invention may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

Thus, FIG. 2A illustrates an exemplary networked or distributed environment, with a server in communication with client computers via a network/bus, in which the present invention may be employed. In more detail, a number of servers $10a$, $10b$, etc., are interconnected via a communications network/bus 14, which may be a LAN, WAN, intranet, the Internet, etc., with a number of client or remote computing devices $110a$, $110b$, $110c$, $110d$, $110e$, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to handle coprocessor resource requests from multiple clients.

In a network environment in which the communications network/bus 14 is the Internet, for example, the servers $10a$, $10b$, etc. can be Web servers with which the clients $110a$, $110b$, $110c$, $110d$, $110e$, etc. communicate via any of a number of known protocols such as HTTP. Servers $10a$, $10b$, etc. may also serve as clients $110a$, $110b$, $110c$, $110d$, $110e$, etc., as may be characteristic of a distributed computing environment. Communications may be wired or wireless, where appropriate. Client devices $110a$, $110b$, $110c$, $110d$, $110e$, etc. may or may not communicate via communications network/bus 14, and may have independent communications associated therewith. For example, in the case of a TV or VCR, there may or may not be a networked aspect to the control thereof. Each client computer $110a$, $110b$, $110c$, $110d$, $110e$, etc. and server computer $10a$, $10b$, etc. may be equipped with various application program modules or objects 135 and with connections or access to various types of storage elements or objects, across which files or data streams may be stored or to which portion(s) of files or data streams may be downloaded, transmitted or migrated. Any one or more of computers $10a$, $10b$, $110a$, $110b$, etc. may be responsible for the maintenance and updating of a database 20 or other storage element, such as a database or memory 20 for storing data processed according to the invention. Thus, the present invention can be utilized in a computer network environment having client computers $110a$, $110b$, etc. that can access and interact with a computer network/bus 14 and server computers $10a$, $10b$, etc. that may interact with client computers $110a$, $110b$, etc. and other like devices, and databases 20.

Exemplary Computing Device

Figure 2B:
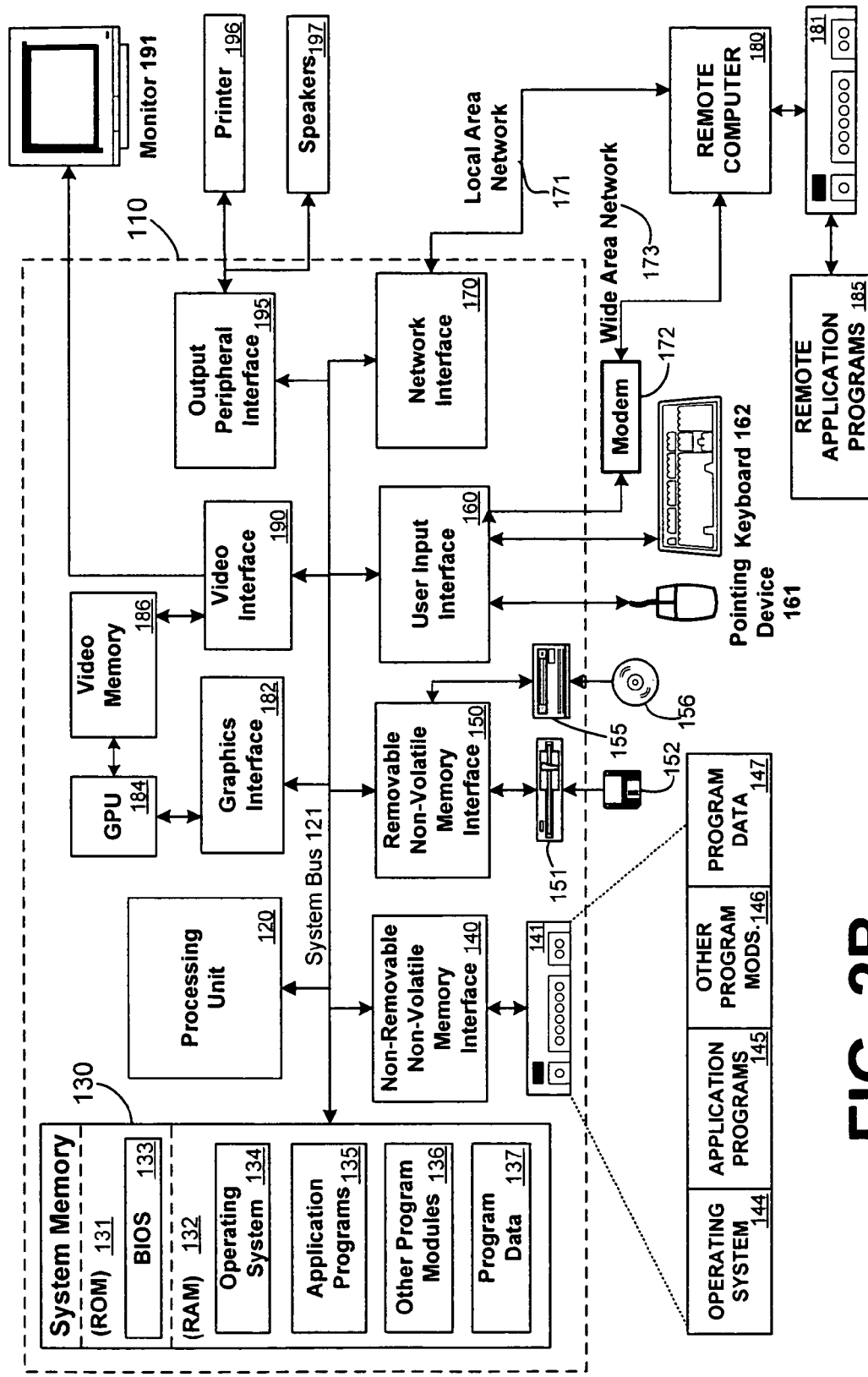
FIG. 2B is a block diagram representing an exemplary non-limiting computing device in which the present invention may be implemented.

FIG. 2B and the following discussion are intended to provide a brief general description of a suitable computing environment in connection with which the invention may be implemented. It should be understood, however, that handheld, portable and other computing devices and computing objects of all kinds are contemplated for use in connection with the present invention, i.e., anywhere where that applications run in a computing environment. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the techniques in accordance with the invention.

Although not required, the invention can be implemented via an operating system, for use by a developer of services for a device or object, and/or included within application software that operates in connection with the techniques of the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations and protocols. Other well known computing systems, environments, and/or configurations that may be suitable for use with the invention include, but are not limited to, personal computers (PCs), automated teller machines, server computers, handheld or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 2B thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 2B, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2B illustrates operating system 134, application programs 135, other program modules 136, and program data 137.

The computer 110 may also include other removable/non-removable, volatile/nonvolatile computer storage media. By way of example only, FIG. 2B illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2B provide storage of computer readable instructions, data structures, program modules and other data for the computer 110. In FIG. 2B, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186, wherein the application variables of the invention may have impact. GPUs 184, however, are but one example of a coprocessor and thus a variety of coprocessing devices may be included in computer 110, and may include a variety of procedural shaders, such as pixel and vertex shaders. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2B. The logical connections depicted in FIG. 2B include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2B illustrates remote application programs 185 as residing on memory device 181. It will be appreciated that the network connections shown are exemplary and other means of establishing a communications link between the computers may be used.

Exemplary Distributed Computing Frameworks or Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s managed code platform, i.e., .NET, includes servers, building-block services, such as Web-based data storage and downloadable device software. Generally speaking, the .NET platform provides (1) the ability to make the entire range of computing devices work together and to have user information automatically updated and synchronized on all of them, (2) increased interactive capability for Web pages, enabled by greater use of XML rather than HTML, (3) online services that feature customized access and delivery of products and services to the user from a central starting point for the management of various applications, such as e-mail, for example, or software, such as Office .NET, (4) centralized data storage, which increases efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform and language integration features as well.

While some exemplary embodiments herein are described in connection with software residing on a computing device, one or more portions of the invention may also be implemented via an operating system, application programming interface (API) or a "middle man" object, a control object, hardware, firmware, intermediate language instructions or objects, etc., such that the methods may be included in, supported in or accessed via all of the languages and services enabled by managed code, such as NET code, and in other distributed computing frameworks as well.

Scheduling of Coprocessor Resources

With respect to some terminology utilized variously herein, a command buffer is a buffer built by the user mode driver and is regular pageable memory allocated in the context of the rendering application.

A Direct Memory Access (DMA) buffer is a buffer built by the kernel mode driver based on the content of a command buffer. The DMA buffer is allocated from kernel pageable memory and visible to the kernel. Page lock and map through an aperture before the DMA buffer can read from it.

A paging buffer is a buffer built by the kernel mode driver to page in/evict/move memory resources needed for a particular DMA buffer. Paging buffers are run right before their DMA buffer counterpart.

Local video memory is memory that resides locally, e.g., on the graphics card. It is dedicated for use of the GPU and is not part of the physical system memory.

System memory aperture is a subset of physical system memory that is visible to the GPU. The CPU can access the physical system memory independent of the aperture.

A design philosophy behind the presented model is that each DMA buffer is patched with actual memory resources address only once, however, the DMA buffer can still be interrupted and have their resources evicted. This implies that upon restarting a previously interrupted DMA buffer, the memory resources are brought into the same location at which they were originally brought.

The following provides an overview of the processing to be done on command buffers that are submitted before they can be executed by the GPU in accordance with the invention. More detail is presented with respect to scheduling considerations below.

Figure 3A:
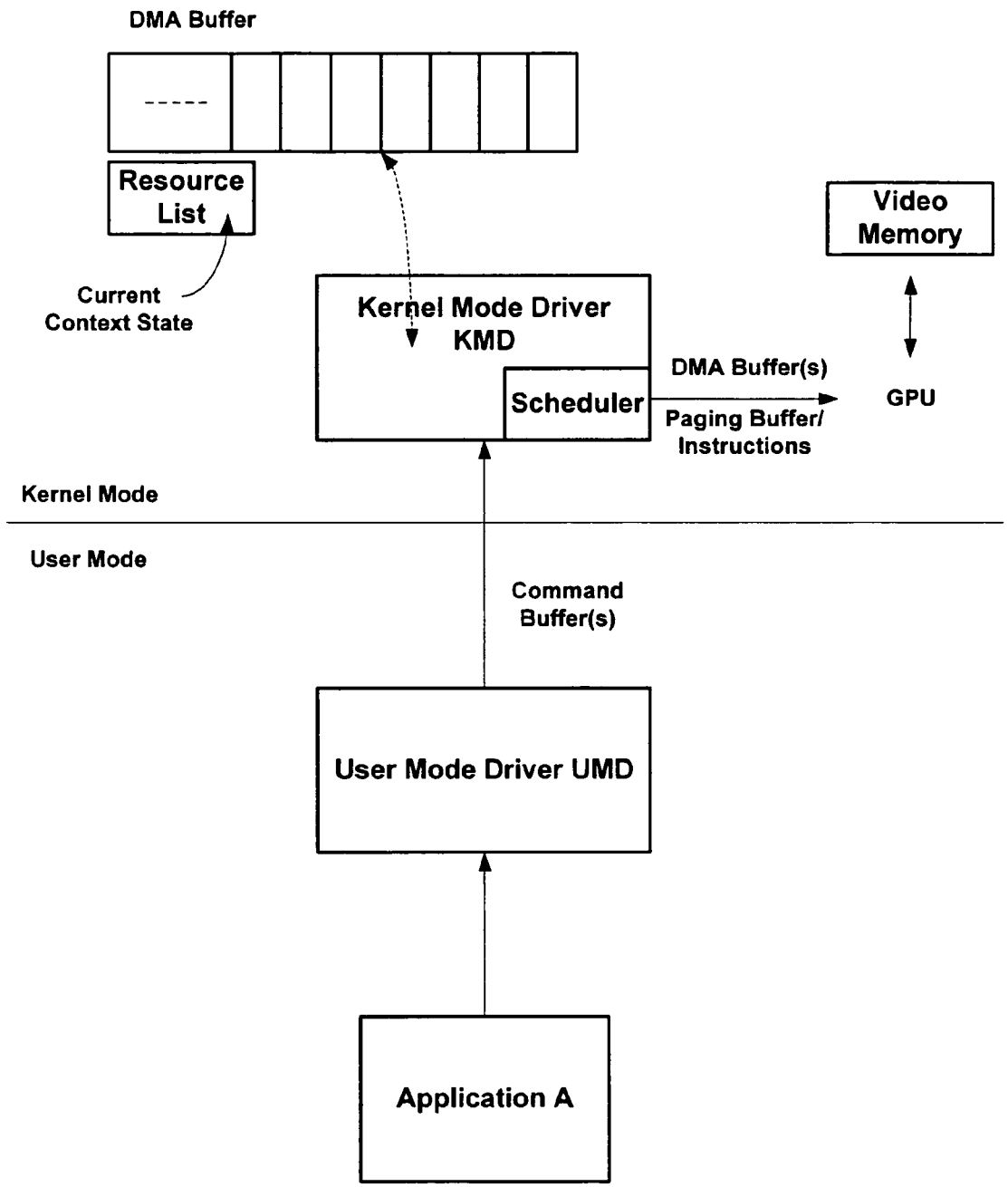
FIG. 3A is an exemplary block diagram of an overall scheduling system in accordance with the invention.

In general, as illustrated in FIG. 3A, command buffers are submitted to the graphics kernel of the kernel mode driver KMD by the user mode driver UMD. The content of the user mode command buffer can be defined by the independent hardware vendor (IHV) and may be chosen to make it easy to translate that command buffer to a hardware specific DMA buffer. The command buffer does not contain direct memory references to memory resources, such as texture or vertex buffers. The command buffer includes a handle provided by the kernel interface when those resources were created.

The translation from the command buffer to the DMA buffer occurs in the kernel mode driver KMD. The IHV validates and copies the command buffer into a kernel mode allocated DMA buffer. That kernel mode DMA buffer is not mapped into the private process space of any application since such mapping would be a security risk (since any thread in that process could be modifying the content of the DMA buffer between the time it is validated and the time it is processed by the hardware).

As part of the validation, the kernel mode driver builds a list of the memory resources that are used by the DMA buffer. For each memory resource, the list includes the kernel handle for the resources and the locations in the buffer where referenced. The list of memory resources used by the DMA buffer includes the expected current context state when the buffer is being submitted. In other words, the memory resources that are part of the current hardware state (e.g., current render target, current z-buffer, . . . ) are part of the list and are reprogrammed at the beginning of the DMA buffer since they may have changed location since the last submitted DMA buffer.

Before the scheduler submits a DMA buffer to the GPU, the scheduler goes through the list of memory resources that was built by the driver and tries to find a location (in conjunction with the kernel driver) for all of them. It is possible that not all the memory resources will fit at once. In this case, the scheduler uses the driver pre-defined split point to split the buffer and try to get only the subset of memory resources needed by this smaller DMA buffer.

Once the scheduler and the driver have figured out where to put each of the memory resources, a paging buffer (that is, a DMA buffer that contains GPU instruction(s) to move memory resources to their assigned location) is generated. The scheduler calls into the driver again with the decided location for each surface and the driver generates a set of GPU instructions that move all of the needed memory resources into place, while evicting those that are unnecessary.

At this point, the location of all the memory resources is known, and the scheduler can call into the driver once again to give it a chance to patch the DMA buffer with the actual location of the memory resources. Finally, the scheduler is ready to submit both the paging buffer (if it exists) and the DMA buffer to the hardware to be processed.

Figure 3B:
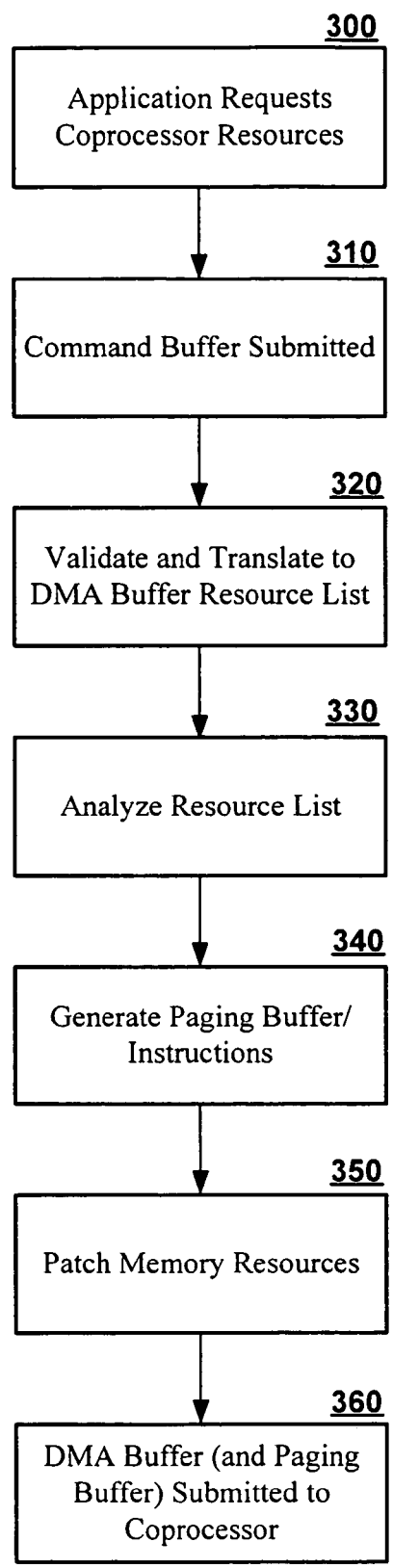
FIG. 3B is an exemplary flow diagram of an overall scheduling system in accordance with the invention.

FIG. 3B illustrates an exemplary non-limiting flow diagram of the scheduling system of the invention. At 300, an application submits a work request for coprocessing resources to the user mode driver. At 310, the user mode driver submits a command buffer corresponding to the work request to the kernel mode driver. At 320, the kernel mode driver validates and translates the command buffer to a DMA buffer and builds a resource list. At 330, the resource list is analyzed in order to determine efficient allocation for memory resources that will be needed. At 340, a paging buffer is generated and instructions are sent to the coprocessor to move memory resources into place in video memory. At 350, patch DMA buffer with actual location of the memory resources. At 360, the DMA buffer is submitted, potentially with a paging buffer.

In accordance with the invention, the previously discussed operations occur before a DMA buffer can be submitted to the hardware. However, some of these operations can not be processed at the time when the command buffer is submitted to the kernel mode driver KMD. For example, the actual memory resources location may not be able to be determined until right before a DMA buffer is to be submitted since the video memory resources could be moving with each DMA buffer that is running on the GPU.

Some of these operations are time consuming and thus it is generally not feasible for them to be done at interrupt time after the scheduler picks which task to run next. Similarly, since they are time consuming, it is desirable to execute them on the CPU while the GPU is busy doing other things to minimize GPU starvation. For these reasons, a worker thread is added to the scheduler that helps with handling some of the time consuming setup work.

Figure 4:
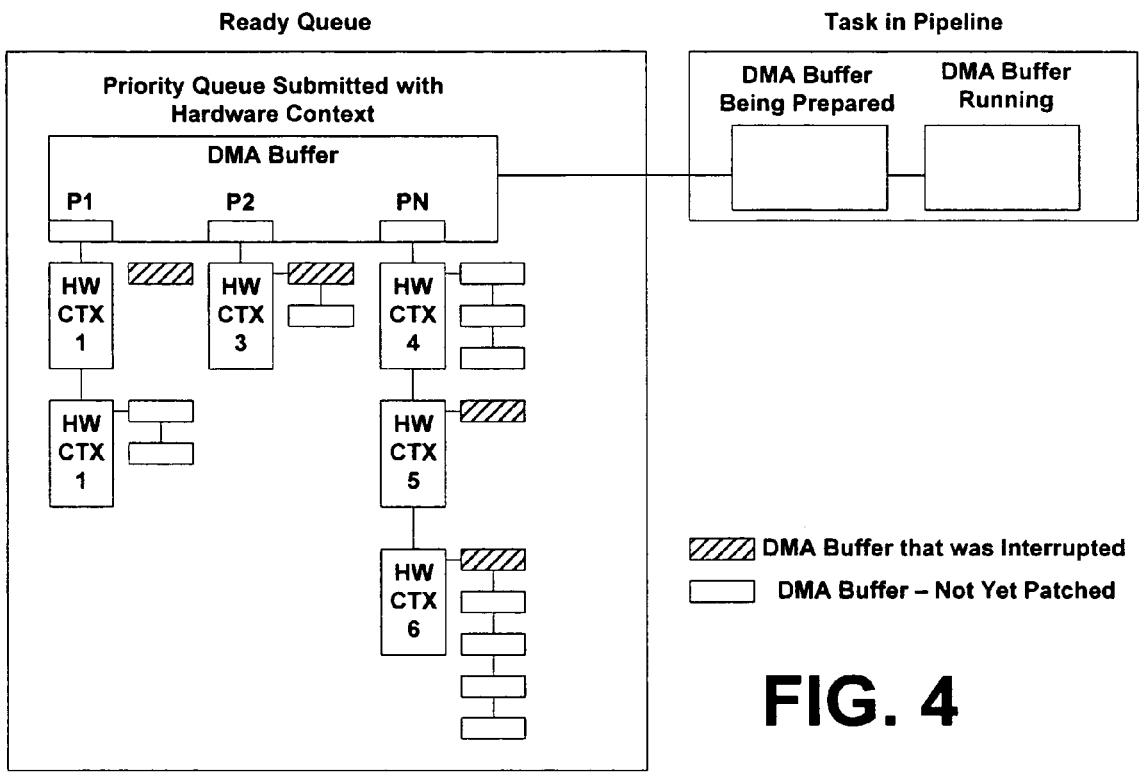
FIG. 4 illustrates a basic scheduling model in accordance with the present invention.

As generally illustrated in FIG. 4, at any given time, there's a running DMA buffer, a DMA buffer being prepared and a list of DMA buffers ready to be prepared (note that all of them can be empty if no tasks are submitted). A new DMA buffer being submitted is inserted in the ready queue and ordered appropriately depending on priority. However, a new DMA buffer being submitted does not preempt the DMA buffer that was elected as the next task for the GPU. The reason for this behavior is that preparing a DMA buffer might involve paging memory resources in and out of video memory and result in changes in the persistent state of the video memory manager and the kernel mode driver. If the task being prepared were preempted, all the changes that were made to the persistent state of the video memory manager and the kernel mode driver would first be undone and then, the newly elected DMA buffer would be prepared. Undoing the work halfway through is not trivial, and can potentially lead to more frequent GPU starvation.

Figure 5:
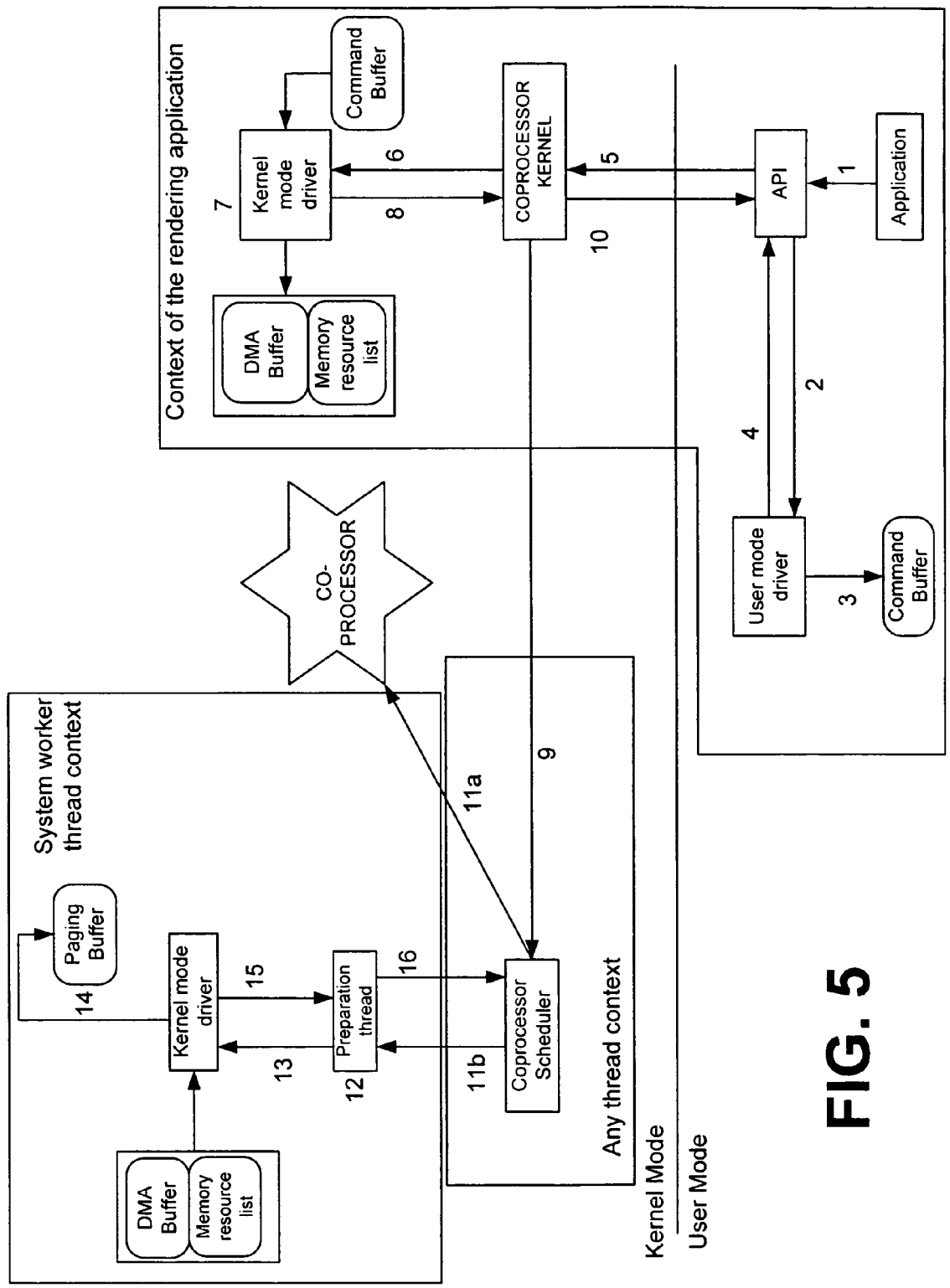
FIG. 5 is an exemplary illustration of computing components involved in providing the scheduling of the invention.

FIG. 5 illustrates an exemplary non-limiting diagram presenting a simplified timeline of operations executed before the GPU can run a DMA buffer. FIG. 5 presents a series of sequential acts that will be described below. The acts are presented sequentially for the purpose of clearly explaining and enabling the invention, and should not be construed as presenting a required sequence for practicing the invention. The order may be varied in accordance with known or future developed practices in the art. The following discussion will begin with an overview of the systems and methods of FIG. 5, and proceeds to a more detailed discussion of some aspects of FIG. 5.

Step 1 represents an application call to an Application Program Interface ("API"). An application can be any set of files that make up software for the user. An API is typically a language and message format used by an application to communicate with an operating system kernel, but also refers to such a format for communication with other control programs such as database management systems (DBMS) or communications protocols. One exemplary API for use in conjunction with the present invention is the Direct3D Runtime API developed by MICROSOFT®.

Step 2 represents a call from an API to a user mode driver. The user mode driver, generally, is a program routine (or hardware) that can link a software system (often an operating system) to a peripheral subroutine, which can be either software or hardware. Here, the user mode driver receives calls from the API that can contain API parameters corresponding to the original call from step 1. Step 3 represents the accumulation of rendering commands, as generated by a user mode driver, in a command buffer. A buffer is a region of memory reserved for use as an intermediate repository. Data can be temporarily held in a buffer while waiting to be transferred between two locations, such as a data area and a processor or coprocessor for processing. The particulars of command buffer content, as generated by the user mode driver, can be chosen to facilitate translation into a hardware specific DMA buffer, as described further below. Also, it may be useful, in defining a command buffer, to omit direct memory references to memory resources, such as "texture" or "vertex buffer." Instead, Independent Hardware Vendors ("IHVs") may define command buffers that optionally contain handles, such that a kernel interface may provide memory references to a command buffer at the time such memory resources are created.

Step 4 represents the flushing of the command buffer. "Flushing" simply refers to emptying it of the accumulated rendering commands. The rendering commands may be sent back to the API, as illustrated, for the purpose of delivering them to a coprocessor kernel as demonstrated in FIG. 5. Flushing may occur for any reason, including but not limited to flushing because the command buffer is full and requires more space for incoming rendering commands, and existence of high priority rendering commands in the command buffer that require immediate processing.

Step 5 represents flushing accumulated command buffers by the API to the coprocessor kernel. A kernel is generally known as the core part of an operating system, the portion that optionally manages memory, files, and peripheral devices, and may also launch applications and allocate system resources. It will be appreciated that a coprocessor kernel can be any type of kernel, including the primary system kernel, or a separate, coprocessor specific kernel, or, for example, a specific type of kernel such as a MICROSOFT® (DirectX Kernel ("DXG").

Step 6 represents the submission of the command buffer to a kernel mode driver. coprocessor kernel. The coprocessor kernel can direct the command buffer to a kernel mode driver. The kernel mode driver may generally be a driver, as described above with reference to the user mode driver, except that the kernel mode driver can operate in kernel mode, as its name suggests. In this regard, a kernel mode driver can be responsible for translating a command buffer into a DMA buffer. IHVs may consider providing the appropriate mechanisms to ensure proper validation and copying of command buffers into kernel mode allocated DMA buffers. DMA buffers may be hardware-specific, in that they are collections of commands ultimately destined for a coprocessor and therefore should properly interface with the coprocessor and supporting hardware.

Notice the horizontal line across FIG. 5 that separates user mode and kernel mode. As the line suggests, the invention can operate within the traditional layout of computer memory allocation, which is implemented for security of the system. The user mode is non-privileged memory, and can be accessed by applications. The kernel mode, on the other hand, is privileged and cannot be accessed by applications. While a kernel mode allocated DMA buffer can theoretically be mapped into any memory space, but it should be kept in mind that mapping into the private process space of applications can lead to security risks. This is because the content of any virtual address referred to by threads in an application's private process space can be modified; in other words the content of the DMA buffer could be modified between the time it is validated and the time it is processed by the hardware.

As step 7 indicates, the kernel mode driver may also build a list of the memory resources to be used by the DMA buffer. This may be accomplished as part of the validation of the command buffer. The list could contain, for example, a kernel handle for the various memory resources on the list, and a buffer location where memory resources are referenced. This list may also include an expected context state for the listed memory resources. This allows the memory resources that are part of any current hardware state (e.g., "current render target," "current z-buffer," and the like) to be part of the list to be reprogrammed at the beginning of the DMA buffer, since they may have changed location since the last DMA buffer that was submitted to a coprocessor.

Step 8 represents sending a DMA buffer, along with any memory resources list, to a coprocessor kernel. The coprocessor kernel may then submit the DMA buffer to a coprocessor scheduler, as shown in step 9, and return to user mode, as in step 10.

A coprocessor scheduler is generally responsible for scheduling the flow of tasks for the coprocessor (as embodied in various DMA buffers and other work sent to the coprocessor). The functionality of the coprocessor scheduler is potentially very broad, and this description contains many potential functions that the coprocessor scheduler may perform. The coprocessor scheduler may be referred to as either a coprocessor scheduler or simply as a scheduler. In various embodiments, as shown in FIG. 5, the scheduler may perform one or more functions prior to submitting the DMA buffer to a coprocessor. Step 11*a* dynamically illustrates that one function of the scheduler is to submit DMA buffers that are ready for processing.

Step 11*b* represents selection of a DMA buffer that the scheduler determines either to add to a list of prepared DMA buffers or to run next. In this regard, the scheduler can pass the DMA buffer to a preparation thread. A preparation thread, as the term is used here, generally provides the function of ensuring that the proper memory resources are on hand for processing the DMA buffer. First, the preparation thread may call a supplemental memory manager process (not shown) to determine a sufficient location in which to page all required memory objects (in the graphics context, "surfaces") that are not currently in supplemental memory (this is step 12). Note that the term "supplemental memory" refers to memory that is allocated for use by the coprocessor; in the case of a GPU coprocessor, supplemental memory is often referred to as "video memory."

It is possible that not all the memory resources required by a DMA buffer will fit into available supplemental memory at once. The supplemental memory manager can fail to bring all the surfaces in supplemental memory at this point for diverse reasons. If this should occur, some further processing may be done to make more room in supplemental memory, or, alternatively or in combination with making more room, the DMA buffer can be split into multiple fragments. In this case, the preparation thread can use a driver pre-defined split point to split the buffer and attempt to locate the subset of memory resources needed by this smaller DMA buffer.

Once sufficient supplemental memory has been located for the DMA buffer, the preparation thread can call a kernel mode driver, as illustrated by step 13. This may be the kernel mode driver mentioned in conjunction with steps 6, 7, and 8, or it can be a separate kernel mode driver, as will be appreciated by those of skill in the art.

Step 14 illustrates that the kernel mode driver can build a paging buffer for the DMA buffer awaiting processing. The kernel mode driver may build this paging buffer based on processing commands from the preparation thread. A paging buffer is a buffer, as defined above, for the purpose of paging memory resources. "Paging" refers to changing the physical address of a block of memory (a page) using mapping hardware. A paging buffer, generally speaking, is a DMA buffer that contains coprocessor instructions to move memory resources to their assigned location. The paging buffer serves the function of bringing any memory resources required by a DMA buffer to a correct memory location, from which those resources can be accessed by the coprocessor when needed. If a paging buffer is properly generated, the location of any requisite memory resources for a particular coprocessor task (i.e., a DMA buffer) is known.

Step 15 represents notification to a preparation thread that a paging buffer has been generated. Step 16 represents a signal to the scheduler that a paging buffer is ready. The scheduler may at this point assume that a next DMA buffer is ready for processing, or it may go on to conduct further preparation operations on a DMA buffer prior to sending it to a coprocessor for processing. For example, since memory locations may have changed since the creation of the original DMA buffer, the scheduler may at this point call into the kernel mode driver once again to allow it to patch the DMA buffer with the actual location of memory resources. Finally, the scheduler may submit both the paging buffer (if it exists) and the DMA buffer to the coprocessor (and any other auxiliary hardware) to be processed.

Figure 6B:
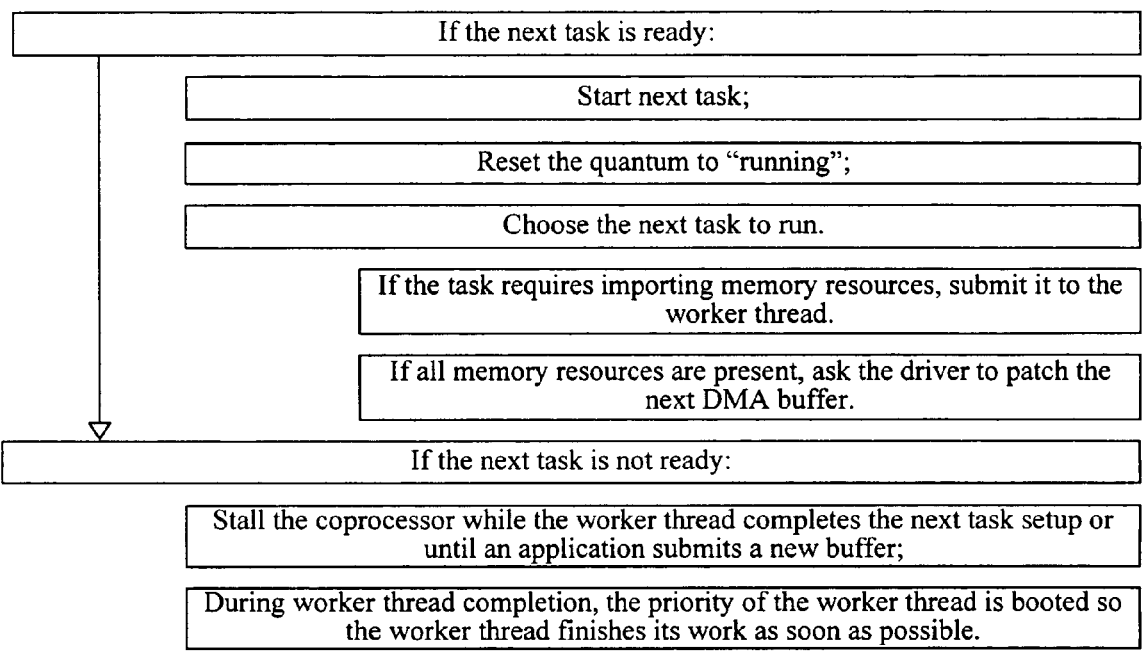

Steps 1 through 16 as described above can be implemented through hardware, software, and a combination thereof. In this regard, FIGS. 6A and 6B generally illustrate the steps of FIG. 5 in the form of a pseudo algorithm. FIGS. 6A and 6B are not an exhaustive list of the potential pseudo algorithm steps that may be practiced in connection with this invention, and it should not be construed that each and every step in FIGS. 6A and 6B are necessary to practice the invention. Instead, FIGS. 6A and 6B are a suggestive list for the purposes of teaching the invention.

The above discussion provided in connection with FIG. 5 is a description of various embodiments of the invention. Multiple advancements have been discovered, however, in connection with the implementation of the invention as described above. The remainder of this description is for the purpose of enabling the various improvements and overcoming difficulties that may arise in practicing the invention.

Some or all of the operations defined previously (see steps 1-16, above) may occur before a DMA buffer is submitted to the hardware. However, some of these operations may be difficult to perform until the DMA buffer is submitted to the hardware. For example, the location of memory resources may be difficult to determine until the instant before a DMA buffer is to be submitted to the coprocessor. This is because supplemental memory resources could be moved with each DMA buffer as it is run on the coprocessor.

Some of the operations encompassed by steps 1-16, above, may be time consuming and thus can not be done at an interrupt time, for example after the scheduler picks which task to run next. Similarly, precisely because they are time consuming, it would be beneficial to execute them on the central processing unit ("CPU") while the coprocessor is busy doing other things. This is to minimize coprocessor starvation. Coprocessor starvation merely refers to time spent in which the coprocessor is not performing processing functions. In response to this problem, it may be beneficial to utilize a "worker thread" in conjunction with the scheduler. A worker thread can perform the function of helping to handle some of the time consuming setup work. A worker thread was added into to pseudo algorithm of FIG. 6B for an example of its operation in connection with the other processes of the invention.

Further to this scheduling consideration, it is noted that at any given time in the system of FIG. 5, there may be a running DMA buffer (i.e., a DMA buffer currently being processed by the coprocessor), a DMA buffer being prepared, and a list of DMA buffers that are ready to be prepared. New DMA buffers, on submission to the scheduler, can be inserted in the ready queue and ordered appropriately depending on their priority. However, various embodiments of the invention may increase functionality if a new DMA buffer, on submission to the scheduler, can not preempt the DMA buffer that was selected as next task for the coprocessor. The reason for this is that preparing a DMA buffer might involve paging memory resources in and out of supplemental memory. Therefore preemption of the next DMA buffer selected for processing could result in changes to the persistent state of the supplemental memory manager. If the task being prepared could be preempted, it could result in undoing changes that were made to the persistent state of the supplemental memory manager, due to the preparation of the newly elected DMA buffer. Undoing changes to supplemental memory halfway through operation on a DMA buffer task may not be trivial, and can lead to potentially more frequent coprocessor starvation.

With respect to latency to schedule a high priority task, because the currently selected DMA buffer being prepared is not allowed to be preempted, the latency to schedule a high priority DMA buffer is increased. When a high priority DMA buffer is submitted, it can ask the scheduler to interrupt the currently running task. However, before the scheduler can do so, it finishes running the paging buffer for the currently running task and it runs the paging buffer for the task that was being prepared (if the task that was being prepared didn't have a paging buffer, than it could potentially be skipped and the scheduler could go to the high priority thread right away).

Figure 7:
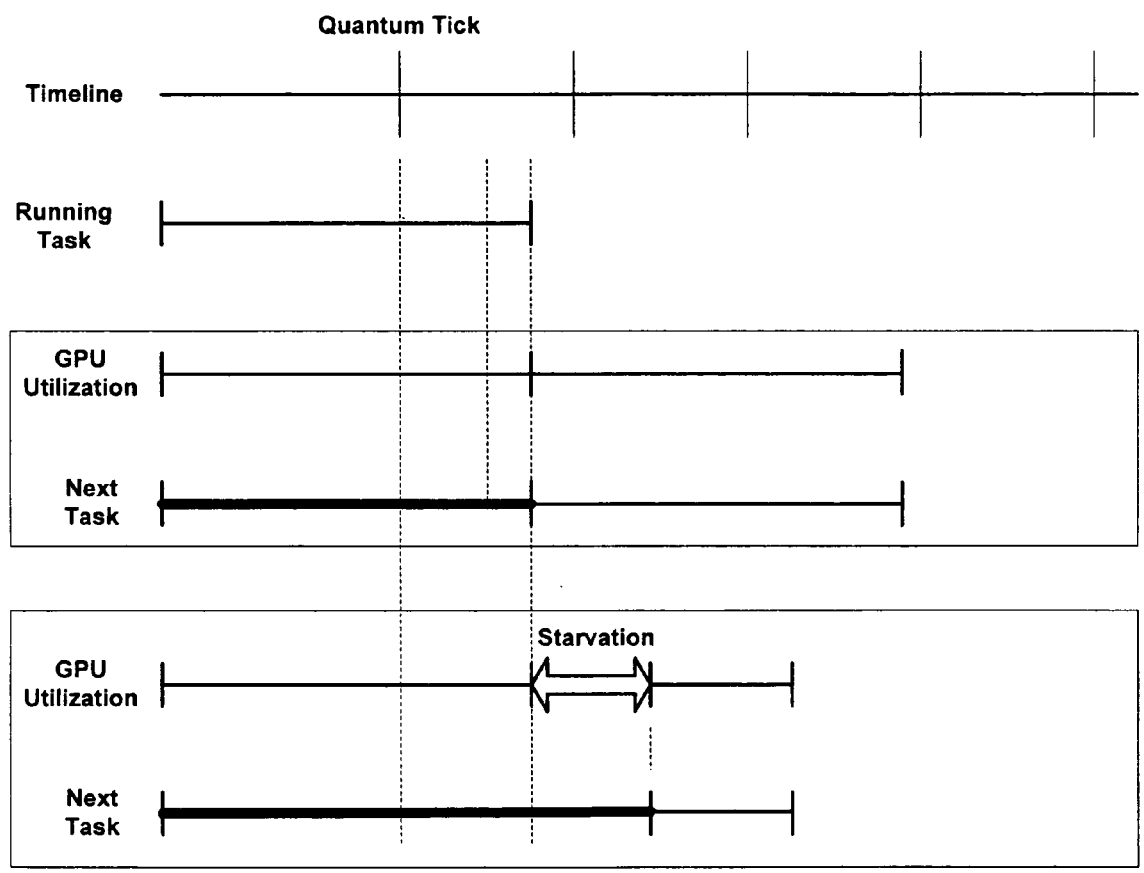
FIG. 7 illustrates exemplary aspects and concepts relating to GPU starvation.

With the invention, the hardware is spoon fed with the task to be next accomplished. This can lead to GPU starvation if the time to prepare a buffer has not expired by the time the GPU finishes with a task. This happens when the preparation time for the DMA buffer being prepared is longer than the time that is remaining for the currently running DMA buffer to complete. This is illustrated in FIG. 7 wherein the first GPU utilization and next task illustrated show a task that takes more than one quantum to complete its preparation. However, the currently running task does not stop at the quantum end. Instead, it remains in control of the GPU and there is no starvation. In the second GPU utilization and next task illustrated, the currently running task ends before the preparation for the next task can be completed. The GPU starves while preparation is completed.

With respect to random eviction of memory content, since memory resources used by an interrupted DMA buffer are not locked into memory, they can be evicted when another DMA buffer needs to run. When an interrupted DMA buffer needs to be scheduled again, all the memory resources it uses are brought back to the same memory location where they were before the interruption. This means that whatever has been put there since then is evicted regardless of the process to which it belongs.

This can lead to fighting between tasks of the same priority trying to use the same region of memory. Each time one of the tasks would get scheduled, it would move its stuff in invalidating the other task's memory resources. The scheduler takes this effect into account and changes the algorithm used to pick up which DMA buffer to run depending on memory conditions.

When a command buffer is submitted to the kernel mode driver in accordance with the invention, the driver generates a hardware specific DMA buffer and a list of resources that is needed to run that DMA buffer. The resource list may be defined according to a predetermined format.

The memory resource list provides timeline information about the different memory resources that are used by the DMA buffer. The scheduler uses that information to page in the required memory resources before the DMA buffer is run and to potentially split the DMA buffer in cases where it uses too many resources at once.

In order for the scheduler to be able to split the buffer, the driver provides timeline information in the list. This can be done by having the driver specify an offset within the DMA buffer where the resource is being programmed and a resource identifier specifying the usage of the resource at the specified offset. Since a memory resources can appear more than once in a DMA buffer, this means that the same memory resources may appears multiple time in the resource list. Each reference to a memory resource in a DMA buffer adds one entry to the resource list.

In and of itself, the handle/offset list may not be enough to give the runtime timeline information about the memory resources that it needs to split the buffer. In order to know precisely when a particular memory resource is needed in a DMA buffer, the scheduler needs to know when it is being replaced by another resource. For example, texture A could be used at the beginning of a DMA buffer for the first texture stage, replaced by texture B in the middle and then come back at the end. The scheduler needs to know that information so it can split the DMA buffer in chunks that will use less memory resources, if needed. However in the scenario described above, texture B could have been programmed in the second texture stage in which case it would have been used at the same time as texture A and would not have replace it.

In order to obtain this finer grain temporal information about the usage of the memory resources throughout the DMA buffer, the driver provides a resource identifier for each entry in the list. A resource identifier is simply an integer value that represents how a particular memory resource is going to be used. For example, a value of 0 could indicate that a memory resource is being used as a render target while a value of 1 could indicate that a resource is being used as a z-buffer. With this information, the scheduler can determine if texture B is replacing texture (both have the same resource identifier) or being used at the same time (both have different resource identifier). The actual value for the resource identifier and their meaning can be defined by the IHV. However the values are zero based and the driver specifies the maximum index it will use at driver initialization time.

Figure 8:
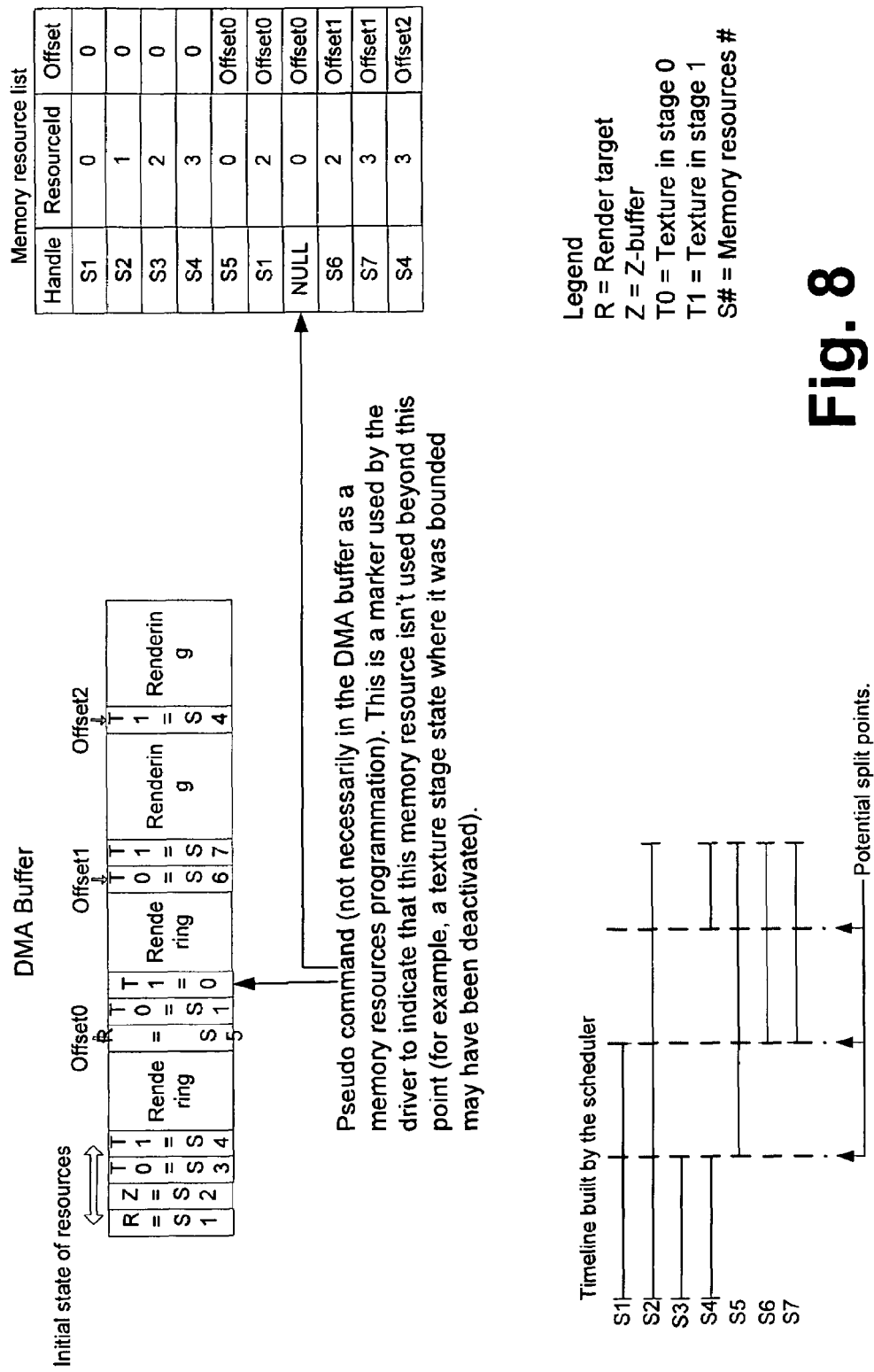
FIG. 8 illustrates how a scheduler may use information to define a timeline for the memory resources being used in a DMA buffer.

FIG. 8 illustrates how a scheduler may use provided information to define a timeline for the memory resources being used in a DMA buffer. The scheduler can proceed to use the timeline to define buffer split points. It may be important to note that, in general, DMA buffers should start with a "setup," or identification process, of current memory resources (i.e., those that were current at the end of the previous DMA buffer). The reason for this is that memory resources may have moved since a previous DMA buffer was executed and thus might need to be reprogrammed. Memory resources may need to be reprogrammed up until the moment the DMA buffer is scheduled for processing.

It is noted that DMA buffers start with a setup of the current memory resources (i.e., those that were current at the end of the previous DMA buffer). The reason for this is that those resources may have moved since the last DMA buffer was executed and thus might need to be reprogrammed. Whether or not they will be reprogrammed is not known until the moment that DMA buffer is ready for scheduling.

The memory resource list, as illustrated in FIG. 8, may contain any number of fields. The following table provides a nonexhaustive list of useful fields:

| | |
|---|---|
| Handle | Handle of a memory resource |
| ResourceId | Resource identifier optionally specifying how a resource is to be used. |
| Offset | Offset within the DMA buffer where memory resources can be programmed. The scheduler can ask the driver to run the DMA buffer up to that point if it needs to split the buffer because of memory constraints. Thus this offset can provide a valid split point for the DMA buffer. |
| SegmentHint | Specifies a segment the driver would like to use for a particular allocation to provide optimal performance. This can replace the current driver preference for the allocation. |
| BankHint | Specifies a bank within a hinted segment where the kernel mode driver can page an allocation. This can replace a current driver preference for the allocation. |
| SegmentId | Specifies a segment identifier of a segment holding memory resources. This can be filled during paging. |
| PhysicalAddress | Specifies the physical address of a memory resource within a segment. This will be filled during paging. |

With respect to paging, before a DMA buffer can be submitted to be executed by the GPU, all the memory resources it references are brought into memory. This is what is called paging the resources and it involves interaction between the preparation worker thread and the kernel mode driver.

At this step, the system has a DMA buffer that was elected for execution and the list of resources that this DMA buffer is using and the system is to determine how to get each resource in video memory and where. The IHVs have the choice of handling this memory resources placement themselves (if they want to optimize performance by positioning memory surfaces at specific location within a segment) or letting the video memory manager figure it out for them. The following assumes that the IHVs will decide to handle the placement problem themselves. If the IHVs do not want to, they will simply fail the DDI call to resolve the memory placement and the video memory manager will handle it for them.

With respect to paging the memory resources required by a DMA buffer, there might not be enough free video memory available to bring all the resources in, in which case some resources currently in memory are evicted. Similarly, even after evicting everything that can be evicted, it is possible that there is still too many resources required at the same time. In that case, the DMA buffer is split into multiple smaller pieces, all of which require fewer resources to be present in memory. It is also possible that that even after splitting the DMA buffer to the maximum extent possible, the resources required still may be unable to fit in memory. In that case, it is simply not possible to render what the application is asking for, and Windows may terminate the application.

During paging, the video memory manager, with help from the driver, builds a list of commands that are necessary in order to place all the memory resources at appropriate locations. That list of commands is built from the following operations:

Evict: Move a particular memory resource out of its current segment and to system memory in order to make room for other resources; Only memory resources belonging to the process owning the current DMA buffer or memory resources marked for eviction can be evicted by the driver;

Page in: Bring a particular memory resource from system memory to a specified location in video memory; Memory resources are brought in a region of memory that if free. If the driver attempts to bring a surface over another one, then the later surface is first either relocated or evicted;

Relocate: Move a particular memory resource from one video memory location to another. Allocations that are not used by an interrupted DMA buffer can be moved. Similarly, allocations that are locked for direct CPU access can not be moved either.

The driver is allowed to use any of these operations in order to resolve the memory placement problem. The restriction specified for the page in and eviction operation is enforced and obeyed by drivers.

When building the command list, the driver can choose the exact physical address it wants for each memory resources it relocates or paged in into non-aperture segment (e.g. local video memory). For resources that the driver wants to put into an aperture segment (AGP or PCI Express mapped system memory), the driver specifies the appropriate segment but leaves the actual physical address blank. The video memory manager decides where to put those resources in that segment.

It is noted that if the driver does not manage the aperture space, than the driver is unaware of whet whether or it can put the resources into that segment. The driver could, however, call into VidMm when it is building its command list so that VidMm can decide what should be the actual address in that segment. A revert call then undoes the VidMm change to persistent state if the driver decides later that it can not resolve the placement problem after all. An all or nothing approach can also be adopted in which case the driver can decide to manage all or none of the segments.

The command list generated by the driver during the paging operation is used later by the scheduler to generate a paging buffer.

Figure 9:
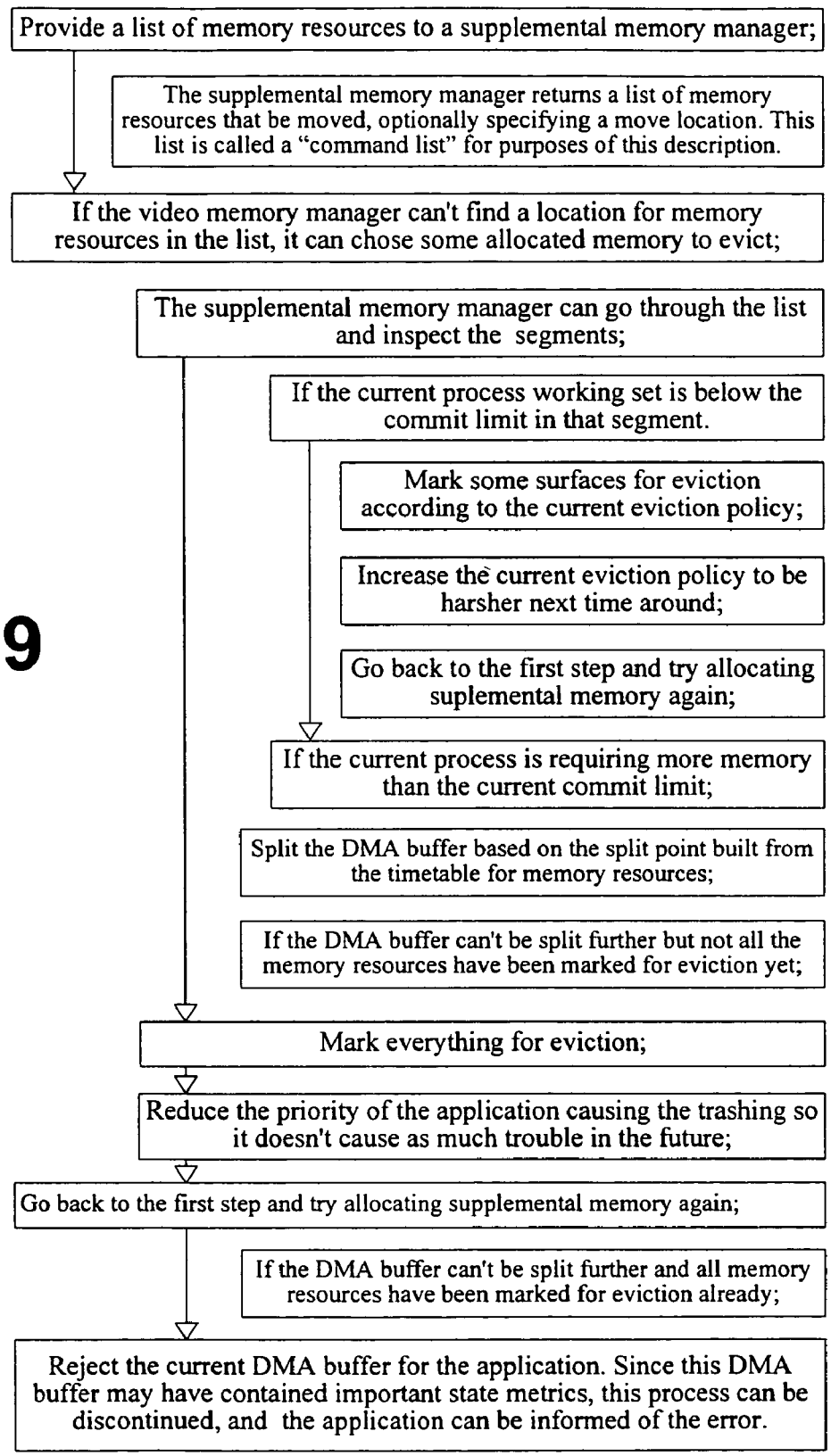
FIG. 9 shows an exemplary non-limiting algorithm illustrating the dynamics between the preparation worker thread and the IHV kernel driver.

FIG. 9 shows an exemplary non-limiting algorithm illustrating the dynamics between the preparation worker thread and the IHV kernel driver.

Once paging is done, the location of every memory resource in the entire segment is known. The scheduler calls back into the driver with the DMA buffer to patch and with the final list of resources with segment/physical address information. The driver goes through the list of resources and patches the DMA buffer accordingly.

For each memory resource that the driver wants to relocate, evict or page in, the driver adds an entry into the command list. In an exemplary embodiment, each entry in the command list has the fields listed in the below table. It is noted that if the driver decides to handle the memory placement problem itself, it specifies the segment id and physical address (when appropriate) for every single memory resources that is relocated or brought in.

In this regard, various embodiments of the invention may provide for the following fields in a command list:

| | |
|---|---|
| Handle | Handle of a memory resource to relocate. |
| SegmentId | Segment identifier for the segment into which a memory resource is currently located. |
| PhysAddress | Current physical address within the current segment of the memory resources. |

-continued

| | |
|---|---|
| Handle | Handle of a memory resource to relocate. |
| NewSegmentId | Segment identifier for the segment where the resources may be moved to. |
| NewPhysAddress | New physical address within a new segment where the resources may be moved. |

When the kernel mode driver cannot find enough free video memory to bring all require memory resources in memory, it can request that the video memory manager marked some of the resources currently in memory for eviction.

Once the scheduler has the command list of operations that are to be executed, the scheduler generates a paging buffer to execute the commands. Some of the commands are pre-processed before they are executed, while others are handled entirely in the paging buffer. Some of the pre-processing can be handled in the worker thread building the paging buffer while some others wait until part of the paging buffer has already been processed. Thus for each command in the list: potentially, some pre-processing is done at the paging buffer generation time; potentially, work on the CPU is done at a sync point in the paging buffer; potentially a blit command is executed to move the memory resources; and potentially, some post-processing work is done on the CPU once the paging buffer is completed.

This means that the paging buffer itself includes some commands that ask the GPU to stop while the CPU handles some work. Thus, any command in the paging buffer can be prefixed or postfixed with a blocking fence (that is, a fence that generates an interrupt and stalls the GPU). However, in order to reduce the number of times the CPU needs to interrupt the GPU, the amount of fences is reduced by aggregating all the post operation fences to the end of the buffer. Cases where post fences are needed before the end of the buffer are detected by the scheduler and merged with the pre-fence of the command that would require the post fence to have been executed.

Figure 10:
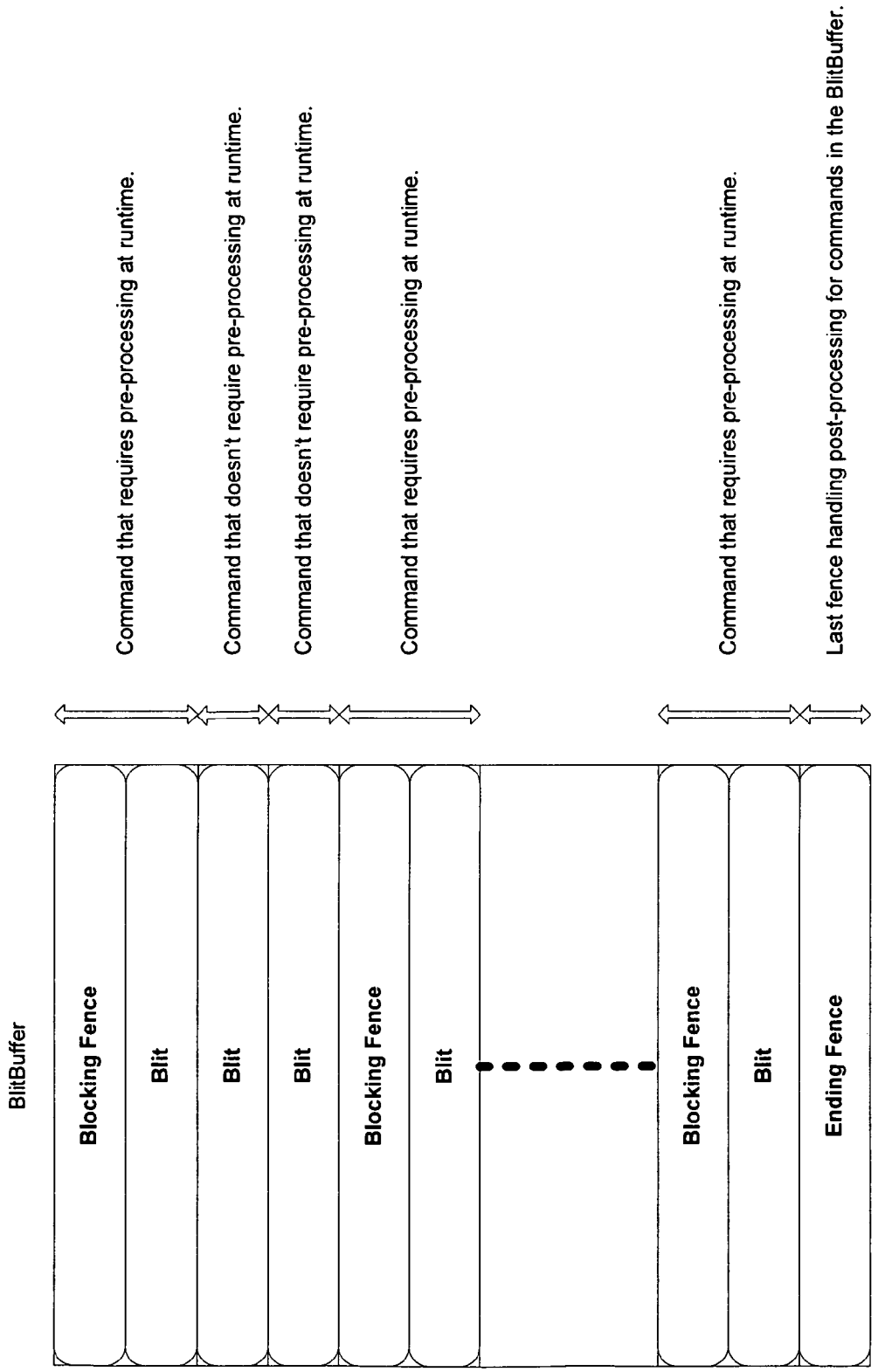
FIG. 10 illustrates an exemplary paging buffer.

An exemplary paging buffer is illustrated in FIG. 10. As illustrated in FIG. 10, some commands may need pre-processing before they can be executed, while other commands may be handled without preprocessing. Pre-processing can be done in any number of ways, including in a worker thread. Note that it may be necessary to wait, in pre-processing commands, until part of the paging buffer has been processed. In the model illustrated by FIG. 10, a worker thread prepares the paging buffer and handles CPU preprocessing for the paging buffer. When CPU preprocessing is needed before an operation in a paging buffer, the worker thread blocks operations on the paging buffer in the coprocessor. It then submits a CPU request before restarting the paging buffer again to complete the operation.

Figure 11:
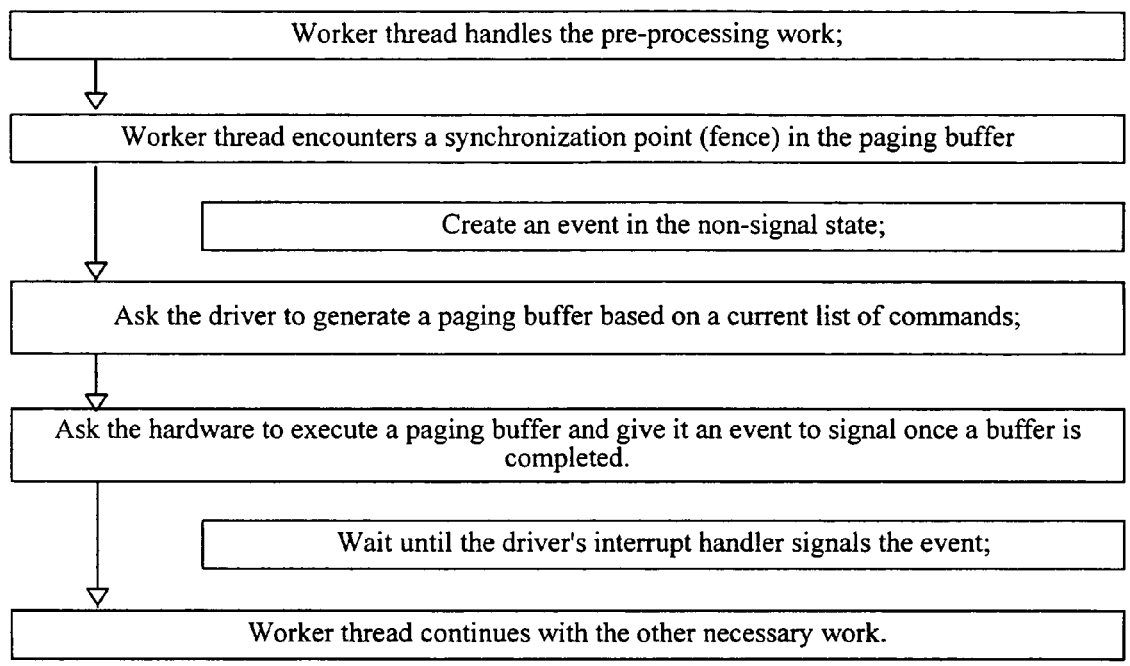
FIG. 11 represents an exemplary algorithm representing a chain of events that may take place in a worker thread.

Refer to FIG. 11 for a pseudo algorithm representing a chain of events that may take place in a worker thread including the handling of a fence in a paging buffer. In connection with FIG. 11, the following table provides a list of generalized commands that may occur in a command list, and the likely ramifications of that type of command in terms of preprocessing, paging buffer generation, and any termination fence that may be generated. The following table is provided as a helpful example only, and is not intended as an exhaustive list of either the types of possible commands or the actions that may occur in connection with those commands.

| | |
|---|---|
| Move from supplemental memory to another supplemental memory location | Pre-Processing:<br>None.<br>In the paging buffer:<br>If the transfer is to be done in hardware<br>   The driver can add a blit in the paging buffer.<br>If the transfer is to be done in software.<br>   Flush the current paging buffer. Once it is flushed,<br>     proceed with a transfer on the CPU.<br>In the termination fence of the paging buffer:<br>None. |
| Move from supplemental memory to aperture | Pre-processing:<br>Attach to the process owning the supplemental memory resources being moved;<br>MmProbeAndLock the system memory buffer and get an MDL for the locked pages;<br>If MmProbeAndLock pages fails<br>   Handle the blit in software;<br>Unattached from the process;<br>If the aperture location that was allocated isn't currently busy and no command is in the command list before the current command, manipulate that aperture range.<br>   Program the aperture with the MDL we generated.<br>   Note that the aperture was programmed.<br>In the paging buffer:<br>If the aperture hasn't been programmed in the preprocessing stage.<br>   Flush the current paging buffer. After flush, program MDL into an aperture. Continue processing the paging buffer.<br>If the transfer is to be done in hardware<br>   The driver will add a blit in the paging buffer.<br>If the transfer is to be done in software;<br>   Flush the current paging buffer. After flush, transfer the memory using the CPU. Continue processing the paging buffer.<br>In the termination fence of the paging buffer:<br>None. |
| Move from aperture to supplemental memory | Pre-processing:<br>Attach to the process owning the supplemental memory resources being moved;<br>MmProbeAndLock the system memory buffer and get an MDL for the locked pages;<br>If MmProbeAndLock pages fails<br>   Handle the blit in software;<br>Unattached from the process;<br>If the aperture location that was allocated is not currently busy and no command is in the command list before the current command, manipulate that aperture range.<br>   Program the aperture with the MDL we generated.<br>   Note that the aperture was programmed.<br>In the paging buffer:<br>If the aperture hasn't been programmed in the preprocessing stage.<br>   Flush the current paging buffer. After flush, program an MDL into the aperture. Continue processing the paging buffer.<br>If the transfer is to be done in hardware<br>   The driver will add a blit in the paging buffer.<br>If the transfer is to be done in software;<br>   Flush the current paging buffer. After flush, transfer the memory using the CPU. Continue processing the paging buffer.<br>In the termination fence of the paging buffer:<br>If the aperture range was not already reclaimed by another operation in the buffer.<br>   Unmap the aperture range;<br>   Attach from the process owning the surface;<br>   MmUnlock the system memory buffer;<br>   Unattach from the process. |
| Eviction from supplemental memory | Same process as move from video to aperture. Except that on the termination fence of the paging buffer the aperture range is unmapped. |
| Eviction from aperture | Pre-processing:<br>If the aperture range isn't busy.<br>   Unmap the aperture range;<br>   Attach to the process owning the surface;<br>   MmUnlock the system memory buffer;<br>   Unattached from the process. |

-continued

```
In the paging buffer:
    None.
In the termination fence for the paging buffer:
    If the aperture range hasn't been unmapped yet by any previous
    operation.
        Unmap the aperture range;
        Attach to the process owning the surface;
        MmUnlock the system memory buffer;
        Unattach from the process.
```

The paging buffer is executed on the GPU before the DMA buffer associated with it. The paging buffer cannot be interrupted. Thus, if the quantum expires before the paging buffer is finished, and the current paging buffer remain in control of the GPU until it is completed. This maintains coherency of video memory. If the paging buffer were interrupted, a determination of what has been processed so far and what hasn't yet been processed would need to be made to undo those changes, taking into account what might have already modified in the state of the video memory while preparing the next DMA buffer for execution. Thus, the preparation of the next DMA buffer is interrupted, what it did to the permanent state of both the video memory manager and the kernel driver is undone, and then, the part of the paging buffer that was not executed is undone.

A hybrid model of two models discussed herein can also be achieved. In the hybrid model, the buffer is patched only once (at the first schedule time) and then any memory resources at their fixed-up location are restored if the hardware command buffer needs to be interrupted and then, the process continues.

In this regard, the user mode driver builds an arbitrarily long command buffer referencing memory resources (e.g., textures) by their kernel handle. The format of the command buffer is defined by the IHV.

Once a buffer is filled or a sync operation needs to be performed, the buffer needs to be handed over to the scheduler to be executed by the hardware. Before this buffer can be executed by the hardware, a few operations are performed:

(1) The memory is allocated for the hardware DMA buffer,
(2) The user mode buffer is copied and validated to the hardware DMA buffer,
(3) A list of memory allocation is generated,
(4) Memory allocation is paged in,
(5) The DMA buffer can potentially be split if not all memory resources can fit at once, and
(6) The DMA buffer is patched with the actual address of the surfaces.

These operations are performed at either submit time or schedule time. Submit time is defined as the time when the user mode driver hand over a command buffer to the kernel driver while schedule time is defined as the time when the scheduler is about to submit a particular hardware DMA buffer to the GPU. In one embodiment, (1), (2) and (3) are done at submit time, while (4), (5) and (6) are done at schedule time.

(1) is done at submit time because allocating space in the hardware DMA buffer to copy the user mode buffer into can take an arbitrarily long amount of time. Indeed, if the hardware DMA buffer is full, one needs to wait until the hardware processes some graphics operation before space is available to copy data. Performing (2) at submit time enables a return to the user mode driver when finished with the submitted buffer. This allow the user mode driver to reuse that driver and eliminate the risk of synchronization issues between the user mode and the kernel mode driver. (3) can be built at the same time as the copy and validation and thus be done at the same time to prevent having to go through the buffer twice.

(4) is done at schedule time because the current state of video memory is needed before a decision can be made regarding what needs to be moved in or out of video memory. Since it is not known at submit time when the DMA buffer is going to be scheduled, it is not yet known what will have changed in video memory at that point. So, a wait ensues until the buffer is ready to be scheduled and while the exact location of where each memory resources in video memory is being decided upon. To move things in and out of memory, the GPU is used. In one embodiment, the driver is asked to build a secondary hardware DMA buffer that is executed before the targeted hardware DMA buffer, which brings all the memory resources to the desired locations. That DMA buffer, referred to as a blitbuffer, can contains multiple fences that will generate an interrupt when CPU intervention is needed. For example, to page in a surface and the location found in AGP to map it for the blit, already used by the GPU at the time of composition of the blit buffer, then the blitbuffer includes a fence right before the blit that interrupts the CPU to allow it to reprogram the aperture and then resume the GPU. Similarly, if the same portion of an aperture is reused during the blitbuffer, then the GPU is stalled because something needs to be done on the CPU before the GPU can be started again.

Since all of the memory resources may not fit, the hardware DMA buffer (5) may need splitting. In one embodiment, at act (3), a worst case estimate is calculated of how much space all the memory resources will take in each segment so as to be able to split the buffer up front. In this case, the work is performed up front and thus scheduling latency is not worsened. In another case, the problem is discovered at schedule time, and the splitting occurs then. Under this case, the best location to do the split is used since it is known exactly where each memory resource can be put.

Finally, once all memory resources are paged in, the kernel mode driver patches the hardware DMA buffer and then it can be submitted to the hardware for execution.

With regard to hardware DMA buffers, from where they are allocated and whether they are pageable, if the DMA buffer is pageable, then it is brought in memory before the content of the user mode buffer is copied into it. There are two possibilities of where to allocate the DMA buffer: in AGP/PCI memory or local video memory.

With respect to AGPIPCI memory, if the buffer is in PCI or AGP memory, it can be written to using a CPU linear address directly to the system pages. This means the system need not wait for a GPU operation in order to have the buffer visible. If the buffer is mapped through AGP (or some GPU aperture in case of PCI Express), that operation is done before the DMA buffer is sent to the hardware, however, the buffer can still be filled even though it is not yet mapped through the aperture.

In the case where the buffer needs to be mapped, it could be mapped up front in an aperture (AGP or other) if there is space. If there is no space, then the aperture is reprogrammed after the GPU notifies the system that it is finished with its current task and along with the time the next task can be started. When the buffer is interrupted, it could be removed from the aperture to make space for another task. This means that on each task switch, a determination is made whether the DMA buffer is resident, and if not, the buffer is brought into memory.

With respect to local video memory, if there is space in video memory for the DMA buffer, it can be taken immediately. But if there is not space, something is scheduled for eviction, i.e., submissions are blocked until the system schedules the corresponding blit buffer.

Two scheduling algorithms may be implemented. First, a list of jobs can be prepared (at every VSYNC) with desired execution times. The list is submitted to the driver, which submits to hardware for auto-scheduling without CPU interaction. Again, at every VSYNC, the driver comes back to us with "actual" execution times for the previous frames. Based on these, the scheduler prepares a list with new times for the upcoming frame. Second, just-in-time scheduling can be implemented wherein the scheduler has no a priori knowledge and execution quantums are determined just-in-time.

In accordance with the invention, there are three classes of scheduler that may be considered depending on the target hardware: Legacy scheduling, Mid primitive scheduling and Scene based scheduling.

Legacy scheduling is targeted for legacy hardware that does not support interruptible hardware. In this case, the only chance a driver has to change a work item being processed by the GPU is after the GPU hits a fence that was inserted in a command buffer. Hardware cannot be interrupted between fence and thus scheduling is dependent on the latency of the command in the DMA buffer in this scenario. Mid primitive scheduling is targeted for future hardware that can be interrupted. With Mid primitive scheduling, there are two approaches that can be taken: Patching DMA buffers at submit time into the ready queue and patching DMA buffers each time before they are submitted. Scene based scheduling is targeted for scene based hardware that requires the entire scene geometry before rendering can begin. This type of scheduler potentially needs two schedulers, one for the geometry processing at the time of scene building and one for the actual rendering of a tile section of the frame buffer after an end scene.

There are multiple ways of implementing the present invention, e.g., an appropriate API, tool kit, driver code, operating system, control, standalone or downloadable software object, etc. which enables applications and services to use the systems and methods of the invention. The invention contemplates the use of the invention from the standpoint of an API (or other software object), as well as from a software or hardware object that receives coprocessor resource requests in accordance with the invention. Thus, various implementations of the invention described herein may have aspects that are wholly in hardware, partly in hardware and partly in software, as well as in software.

As mentioned above, while exemplary embodiments of the present invention have been described in connection with various computing devices and network architectures, the underlying concepts may be applied to any computing device or system in which it is desirable to have efficient coprocessing. For instance, the algorithm(s) and hardware implementations of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. One of ordinary skill in the art will appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the scheduling techniques of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

While exemplary embodiments refer to utilizing the present invention in the context of a GPU, the invention is not so limited, but rather may be implemented to provide scheduling of any kind of coprocessing resource. For instance, sound cards or network cards may include a coprocessor. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed:

1. A method for scheduling operations of a coprocessor in a computing system having a processor and a coprocessor, comprising:
   receiving by a kernel mode driver a command buffer from a user mode driver;
   generating by the kernel mode driver at least one direct memory access (DMA) buffer based on said command buffer;
   generating by the kernel mode driver a resource list comprising at least one graphics data memory resource associated with processing said at least one DMA buffer by said coprocessor, wherein said resource list includes an expected current context state when said DMA buffer is submitted for processing by said coprocessor;
   generating a paging DMA buffer including at least one instruction for the coprocessor to move the at least one graphics data memory resource to an assigned location; and
   submitting said at least one DMA buffer to said coprocessor for processing of DMA buffer contents.

2. A method according to claim 1, wherein the set of at least one DMA buffer is a software queue maintained for each application submitting requests for coprocessor resources.

3. A method according to claim 1, further comprising transmitting said at least one instruction to the coprocessor.

4. A method according to claim 1, wherein said submitting includes submitting said paging buffer to the coprocessor.

5. A method according to claim 1, wherein said generating by the kernel mode driver at least one DMA buffer includes assigning priority to elements in the at least one DMA buffer.

6. A method according to claim 1, wherein said paging buffer includes at least one command that requests the coprocessor to stop processing.

7. A method according to claim 6, wherein said at least one command is a fence that generates an interrupt and stalls the coprocessor.

8. A method according to claim 1, further comprising patching at least one reference to the at least one memory resource with actual memory resource data.

9. A method according to claim 1, whereby said coprocessor processes said at least one DMA buffer in a different order than the order in which said at least one DMA buffer is generated.

10. A method according to claim 1, wherein said coprocessor is busy processing another DMA buffer while the operations of claim 1 are performed.

11. A method according to claim 1, further comprising:
    interrupting the processing of a DMA buffer submitted to the coprocessor according to said submitting; and
    resuming processing of the interrupted DMA buffer.

12. A method according to claim 1, wherein said analyzing includes determining whether said at least one DMA buffer implicates a threshold amount of memory resources.

13. A method according to claim 12, wherein if said at least one DMA buffer implicates more than the threshold amount, splitting said at least one DMA buffer.

14. A method according to claim 1, wherein said at least one instruction includes at least one of an evict, page in and relocate instruction.

15. A method according to claim 1, wherein said method is performed pursuant to operations of an application programming interface associated with computer executable modules including computer executable instructions stored on a computer readable storage medium.

16. A computing device, comprising:
    a processor;
    a coprocessor; and
    a computer readable storage media coupled to the processor and the coprocessor, the computer readable storage media having stored computer-executable components comprising:
        an input interface component for receiving a command buffer from a user mode driver;
        a translator component that generates at least one direct memory access (DMA) buffer based on said command buffer;
        a kernel mode driver component that generates a resource list comprising at least one graphics data memory resource associated with processing said at least one DMA buffer by said coprocessor, wherein said resource list includes an expected current context state when said DMA buffer is submitted for processing by said coprocessor;
        a scheduler component for generating a paging DMA buffer including at least one instruction for the coprocessor to move the at least one graphics data memory resource to an assigned location; and
        an output interface component for submitting said at least one DMA buffer to said coprocessor for processing of DMA buffer contents.

17. A computing device according to claim 16, wherein the set of at least one DMA buffer includes a software queue maintained for each application submitting requests for coprocessor resources.

18. A computing device according to claim 16, wherein said at least one instruction is transmitted to the coprocessor via the output interface component.

19. A computing device according to claim 16, wherein said paging buffer is submitted to the coprocessor via the output interface component in conjunction with submitting said at least one DMA buffer.

20. A computing device according to claim 16, wherein priority is assigned to elements in the at least one DMA buffer.

21. A computing device according to claim 16, wherein said coprocessor is configured to stop processing when requested by said paging DMA buffer which includes at least one command that requests the coprocessor to stop processing.

22. A computing device according to claim 21, wherein said at least one command is a fence that generates an interrupt and stalls the coprocessor.

23. A computing device according to claim 16, wherein at least one reference to the at least one graphics data memory resource is patched with actual memory resource data prior to submission of the at least one DMA buffer.

24. A computing device according to claim 16, whereby said coprocessor processes said at least one DMA buffer in a different order than the order in which said at least one DMA buffer is generated.

25. A computing device according to claim 16, wherein said coprocessor is busy processing another DMA buffer while said at least one DMA buffer is being generated.

26. A computing device according to claim 16, wherein processing of a DMA buffer submitted to the coprocessor is interrupted and then processing of the interrupted DMA buffer is resumed.

27. A computing device according to claim 16, wherein said scheduler component determines whether said at least one DMA buffer implicates a threshold amount of memory resources.

28. A computing device according to claim 27, wherein if said at least one DMA buffer implicates more than the threshold amount, said at least one DMA buffer is split.

29. A computing device according to claim 16, wherein said at least one instruction includes at least one of an evict, page in and relocate instruction.

30. A computing device, including a processor and a coprocessor, configured to schedule operations of the coprocessor, the computing device comprising:
    means for receiving by a kernel mode driver a command buffer from a user mode driver;
    means for generating by the kernel mode driver at least one DMA buffer based on said command buffer;
    means for generating by the kernel mode driver a resource list comprising at least one graphics data memory resource associated with processing said at least one direct memory access (DMA) buffer by said coprocessor, wherein said resource list includes an expected current context state when said DMA buffer is submitted for processing by said coprocessor;
    means for generating a paging DMA buffer including at least one instruction for the coprocessor to move the at least one memory resource to an assigned location; and
    means for submitting said at least one DMA buffer to said coprocessor for processing of DMA buffer contents.

31. A computing device according to claim 30, wherein the set of at least one DMA buffer is a software queue maintained for each application submitting requests for coprocessor resources.

32. A computing device according to claim 30, further comprising means for transmitting said at least one instruction to the coprocessor.

33. A computing device according to claim 30, wherein said means for submitting includes means for submitting said paging buffer to the coprocessor.

34. A computing device according to claim 30, wherein said means for generating by the kernel mode driver at least one DMA buffer includes means for assigning priority to elements in the at least one DMA buffer.

35. A computing device according to claim 30, wherein said coprocessor is configured to stop processing when requested by said paging buffer which includes at least one command that requests the coprocessor to stop processing.

36. A computing device according to claim 35, wherein said at least one command is a fence that generates an interrupt and stalls the coprocessor.

37. A computing device according to claim 30, further comprising means for patching at least one reference to the at least one memory resource with actual memory resource data.

38. A computing device according to claim 30, whereby said coprocessor processes said at least one DMA buffer in a different order than the order in which said at least one DMA buffer is generated by said first means for generating.

39. A computing device according to claim 30, wherein said coprocessor is busy processing another DMA buffer during operation of at least one of said means for receiving, first and second means for generating, means for analyzing and means for submitting.

40. A computing device according to claim 30, further comprising:
    means for interrupting the processing of a DMA buffer submitted to the coprocessor according to said submitting; and
    means for resuming processing of the interrupted DMA buffer.

41. A computing device according to claim 30, wherein said means for analyzing includes means for determining whether said at least one DMA buffer implicates a threshold amount of memory resources.

42. A computing device according to claim 41, further comprising means for splitting a DMA buffer, wherein if said at least one DMA buffer implicates more than the threshold amount, said means for splitting splits said at least one DMA buffer.

43. A computing device according to claim 30, wherein said at least one instruction includes at least one of an evict, page in and relocate instruction.

* * * * *